United States Patent
Oishi et al.

(10) Patent No.: US 11,799,820 B2
(45) Date of Patent: Oct. 24, 2023

(54) NETWORK SYSTEM, COMMUNICATION CONTROL DEVICE, AND COMMUNICATION CONTROL METHOD

(71) Applicant: Hitachi, Ltd., Tokyo (JP)

(72) Inventors: Yuji Oishi, Tokyo (JP); Shigenori Hayase, Tokyo (JP); Masayuki Takase, Tokyo (JP); Mikio Kuwahara, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 17/643,070

(22) Filed: Dec. 7, 2021

(65) Prior Publication Data
US 2022/0182357 A1 Jun. 9, 2022

(30) Foreign Application Priority Data
Dec. 9, 2020 (JP) .................. 2020-204001

(51) Int. Cl.
*H04L 61/251* (2022.01)
*H04L 61/4511* (2022.01)
*H04L 61/5014* (2022.01)
*H04L 101/622* (2022.01)

(52) U.S. Cl.
CPC ........ *H04L 61/251* (2013.01); *H04L 61/4511* (2022.05); *H04L 61/5014* (2022.05); *H04L 2101/622* (2022.05)

(58) Field of Classification Search
CPC ............... H04L 61/251; H04L 61/4511; H04L 61/5014; H04L 2101/622
USPC ........................................................ 709/245
See application file for complete search history.

(56) References Cited

U.S. PATENT DOCUMENTS

| 10,701,046 | B1* | 6/2020 | Kaliski, Jr. | ........... H04L 63/062 |
| 2003/0147395 | A1 | 8/2003 | Gutknecht et al. | |
| 2017/0208032 | A1* | 7/2017 | Cox | .................... H04L 61/2514 |
| 2017/0339727 | A1* | 11/2017 | Barrett | ................ H04L 43/0811 |
| 2021/0064414 | A1* | 3/2021 | Lolage | .................... H04L 45/74 |
| 2021/0320895 | A1* | 10/2021 | Harary | .................. H04L 61/103 |

FOREIGN PATENT DOCUMENTS

| CN | 104735073 B | * | 7/2018 | ........... H04L 45/741 |
| WO | WO 03/067829 A1 | | 8/2003 | |
| WO | WO-2015081542 A1 | * | 6/2015 | ......... H04L 41/0806 |

* cited by examiner

*Primary Examiner* — Wing F Chan
*Assistant Examiner* — Leon Y Tseng
(74) *Attorney, Agent, or Firm* — Crowell & Moring LLP

(57) ABSTRACT

A mobile-side IP address is translated into an intranet-side MAC address, and an IP address for an intranet is acquired. The present invention provides a network system for transferring a packet, including: a first network that controls transfer of data at a first layer; a second network that is connected to the first network and controls transfer of data at a second layer different from the first layer; and a translation device that translates an address between networks, in which the translation device translates the address of the first layer of the first network attached to data transferred from the first network to the second network into the address of the second layer of the second network.

10 Claims, 32 Drawing Sheets

| MOBILE-SIDE IP | INTRANET-SIDE MAC | INTRANET-SIDE IP |
|---|---|---|
| 192.168.1.1 | 01:23:45:67:89:AB | 10.1.10.1 |
| 192.168.1.2 | 01:23:45:67:89:CD | 10.1.10.2 |
| 192.168.1.3 | 01:23:45:67:89:EF | 10.1.10.3 |

MOBILE ADDRESS TRANSLATION TABLE

FIG. 10A

IMMEDIATELY AFTER ADDITION OF ENTRY

| MOBILE-SIDE IP | INTRANET-SIDE MAC | INTRANET-SIDE IP |
|---|---|---|
| 192.168.1.1 | 01:23:45:67:89:AB | |
| | | |
| | | |

MOBILE ADDRESS TRANSLATION TABLE

FIG. 10B

AFTER ASSIGNMENT OF INTRANET-SIDE ADDRESS BY DHCP

| MOBILE-SIDE IP | INTRANET-SIDE MAC | INTRANET-SIDE IP |
|---|---|---|
| 192.168.1.1 | 01:23:45:67:89:AB | 10.1.10.1 |
| | | |
| | | |

MOBILE ADDRESS TRANSLATION TABLE

EXAMPLE OF GUI SCREEN

EXAMPLE OF CLI COMMAND

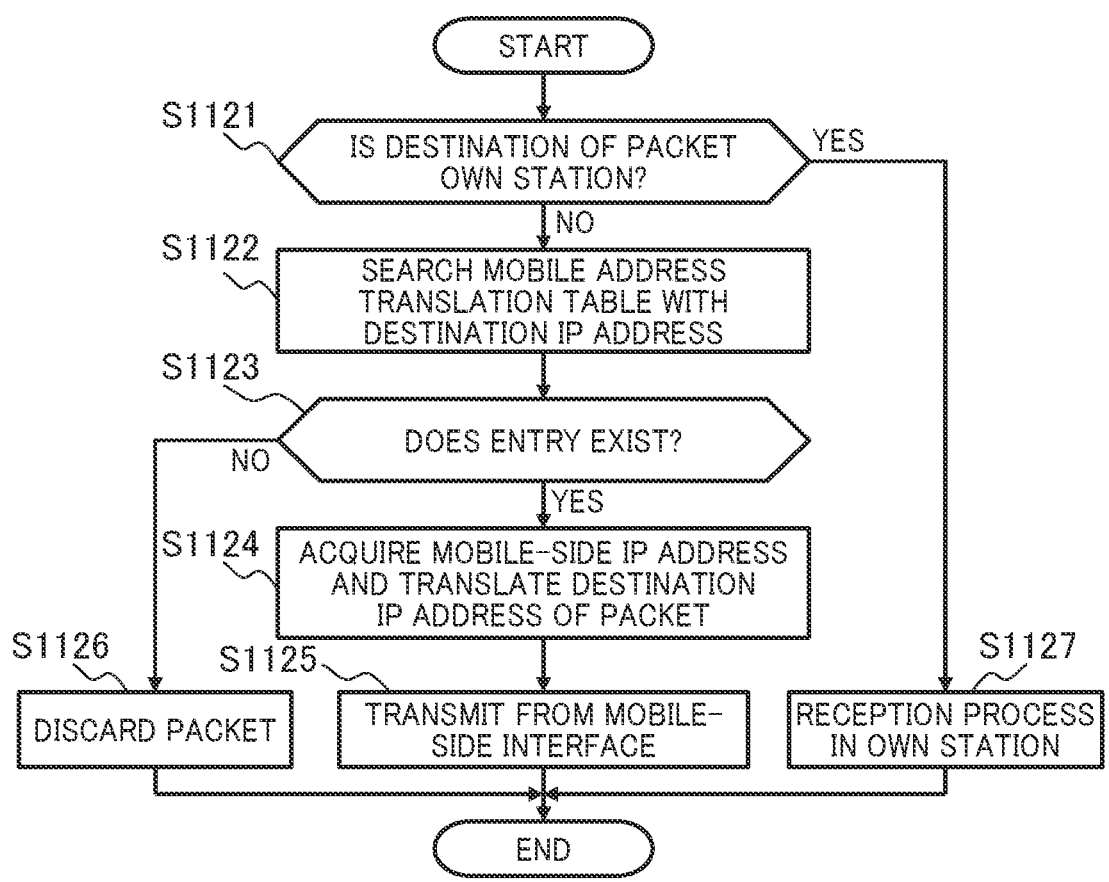

| MOBILE-SIDE IP | INTRANET-SIDE MAC |
|---|---|
| 192.168.10.1 | 01:23:45:67:89:AB |
| 192.168.10.2 | 01:23:45:67:89:CD |
| 192.168.10.3 | 01:23:45:67:89:EF |

INTRANET-SIDE MAC ADDRESS TRANSLATION TABLE

| MOBILE-SIDE IP | INTRANET-SIDE IP |
|---|---|
| 192.168.10.1 | 10.1.1.1 |
| 192.168.10.2 | 10.1.1.2 |
| 192.168.10.3 | 10.1.1.3 |

NAT TABLE

FIG. 25

| MOBILE-SIDE IP | VIRTUAL INTERFACE ID |
|---|---|
| 192.168.10.1 | #1 |
| 192.168.10.2 | #2 |
| 192.168.10.3 | #3 |

VIRTUAL INTERFACE MAPPING TABLE

INTRANET ADDRESS TRANSLATION TABLE

NETWORK SYSTEM, COMMUNICATION CONTROL DEVICE, AND COMMUNICATION CONTROL METHOD

CLAIM OF PRIORITY

The present application claims priority from Japanese patent application JP 2020-204001 filed on Dec. 9, 2020, the content of which is hereby incorporated by reference into this application.

BACKGROUND

The present invention relates to a network system, and particularly to an interconnection technology for a plurality of networks.

With the development of the information communication technology, it is possible to perform communications by connecting a plurality of networks to each other. Since address systems are different from each other in such a plurality of networks, address translation is required. The address systems are different from each other because these networks have different management sources, the addresses are duplicated in some cases.

The following is a prior art as the background art of the technical field. WO2003/67829 describes a method and a device for leasing parameters for setting a network address translator (NAT) in such a manner that in a first dynamic host configuration protocol (DHCP) device, a DHCP lease request from a client is received, a first communication parameter of the client is determined from the DHCP lease request, and the determined first communication parameter can be used by a second DHCP device.

SUMMARY

However, not only because the addresses are duplicated depending on networks, but also because layers at which packets are transferred are different, the types of addresses to be used are different. For example, while a packet is transferred using an IP address in a mobile network such as local 5G, a packet is transferred using a MAC address in a LAN typified by an intranet (hereinafter, referred to as intra) in a company or the like. Therefore, even if the NAT device is provided between the networks, the NAT device cannot acquire the MAC address of the mobile network side, and thus a DHCP inquiry of the LAN side cannot be made, causing a problem that the IP address of the LAN side cannot be acquired.

In addition, although the NAT device translates the IP address, the MAC address of the NAT device is used for address-translated packets, and thus connection authentication of each device by MAC address authentication is impossible. For example, although an IP address is assigned from the intranet side by MAC authentication for each device and DHCP at the time of LAN connection, the MAC address of a terminal in the local 5G is not visible from the LAN at the time of connection from the LAN side to the local 5G.

Accordingly, the present invention provides a technique for translating a mobile-side IP address into an intranet-side MAC address and acquiring an IP address for an intranet.

The following is a representative example of the invention disclosed in the application. That is, the present invention provides a network system for transferring a packet, including: a first network that controls transfer of data at a first layer; a second network that is connected to the first network and controls transfer of data at a second layer different from the first layer; and a translation device that translates an address between networks, in which the translation device translates the address of the first layer of the first network attached to data transferred from the first network to the second network into the address of the second layer of the second network.

According to one aspect of the present invention, a mobile-side IP address is translated into an intranet-side MAC address, and an IP address for an intranet can be acquired. Problems, configurations, and effects other than those described above will become apparent from the description of the following embodiments.

BRIEF DESCRIPTION OF THE DRAWINGS

FIGS. 10A and 10B are diagrams each showing changes in the mobile address translation table in the address registration process of the first embodiment;

FIG. 15 is a flowchart of a destination IP address translation process of the first embodiment;

FIG. 16 is a diagram for showing an example of a DHCP server management screen of the first embodiment;

FIG. 25 is a diagram for showing a configuration example of a virtual interface mapping table of the third embodiment;

DETAILED DESCRIPTION

<Network Configuration Example>

Figure 1:
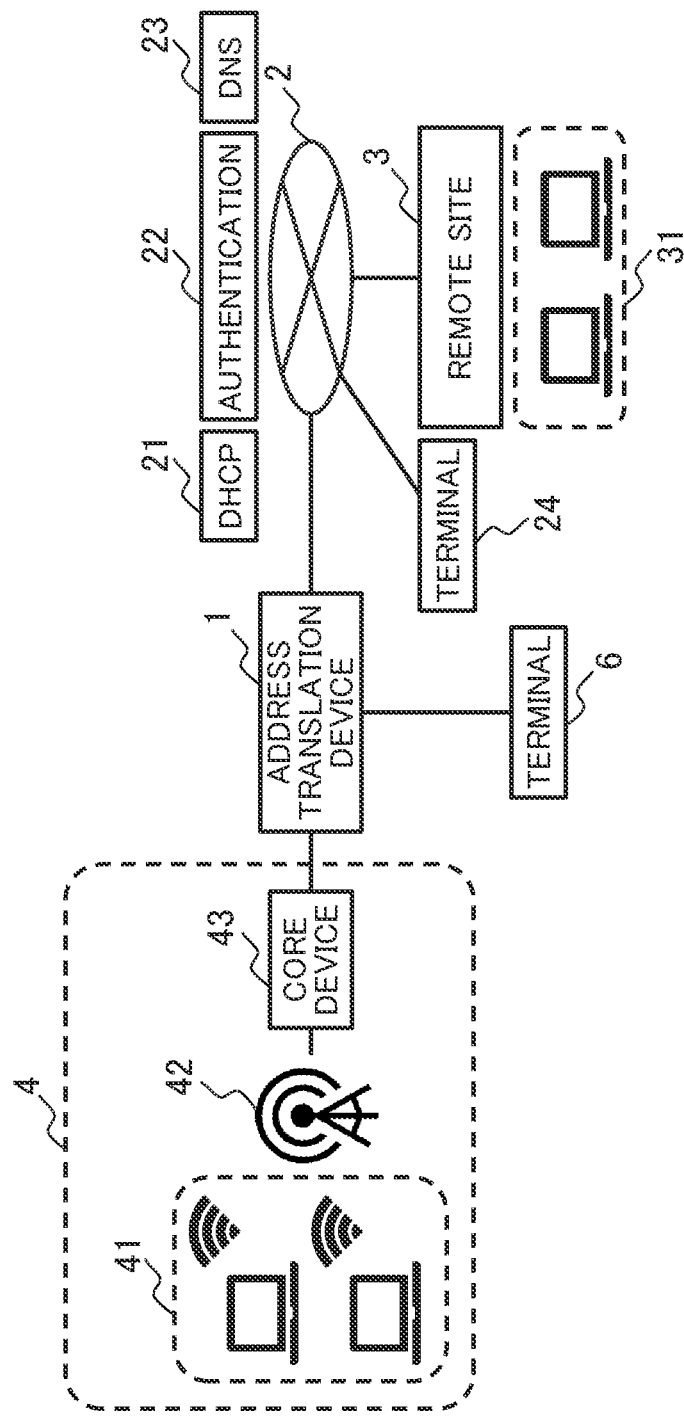
FIG. 1 is a diagram for showing a network configuration of an embodiment of the present invention.

FIG. 1 is a diagram for showing a network configuration of an embodiment of the present invention.

The network configuration example shown in FIG. 1 is configured using an intra-network 2, a mobile network 4, and an address translation device 1 installed between the intra-network 2 and the mobile network 4. The address translation device 1 is preferably installed between the intra-network 2 and the mobile network 4, but may be installed at a place where packets transferred between the intra-network 2 and the mobile network 4 can be captured.

The intra-network 2 is a network for transferring packets by using a MAC address in a layer 2 of the OSI model, and the mobile network 4 is a network for transferring packets by using an IP address in a layer 3 of the OSI model. The address translation device 1 mutually translates an address (the MAC address and the IP address of the layer 2) used in the intra-network 2 and an address (the IP address of the layer 3) used in the mobile network 4. A terminal 6 is connected to the address translation device 1. The terminal 6 sets an address translation rule to a mobile address translation table 14 by an input to an address translation setting screen (see FIGS. 11A and 11B) by an administrator. The configuration of the address translation device 1 will be described with reference to FIG. 5, FIG. 17, FIG. 24, and FIG. 31 in each embodiment.

The intra-network 2 includes a remote site 3 including an intranet server 31, a DHCP server 21, an authentication mechanism 22, a DNS server 23, and a terminal 24. The intranet server 31 transmits data requested from a mobile terminal 41 by access from the mobile terminal 41. The DHCP server 21 assigns an IP address according to a request from a terminal by using DHCP. As will be described later with reference to FIG. 7, the authentication mechanism 22 is configured using an intranet authentication client 22A and an intranet authentication server 22B, and authenticates a terminal connected to the intra-network by using an authentication method such as RADIUS (Remote Authentication Dial In User Service) or LDAP (Lightweight Directory Access Protocol). The DNS server 23 associates a domain name on the intra-network 2 with an IP address, and responds with the IP address or the domain name according to a forward or reverse request. The terminal 24 accepts an input of information set to servers provided the intra-network 2 such as the DHCP server 21, the authentication mechanism 22, and the DNS server 23. For example, an operation of the DHCP server 21 is set by an input to a DHCP server management screen (see FIG. 16) by the administrator.

The mobile network 4 includes a mobile terminal 41, a base station device 42, and a mobile core device 43. The base station device 42 is connected to the mobile terminal 41 by a radio line (for example, a 5G network). The mobile core device 43 has functions of controlling the mobile network 4, such as authentication of the mobile terminal 41, session management with the mobile terminal 41, and aggregation of traffic from the mobile terminal 41.

Figure 2:
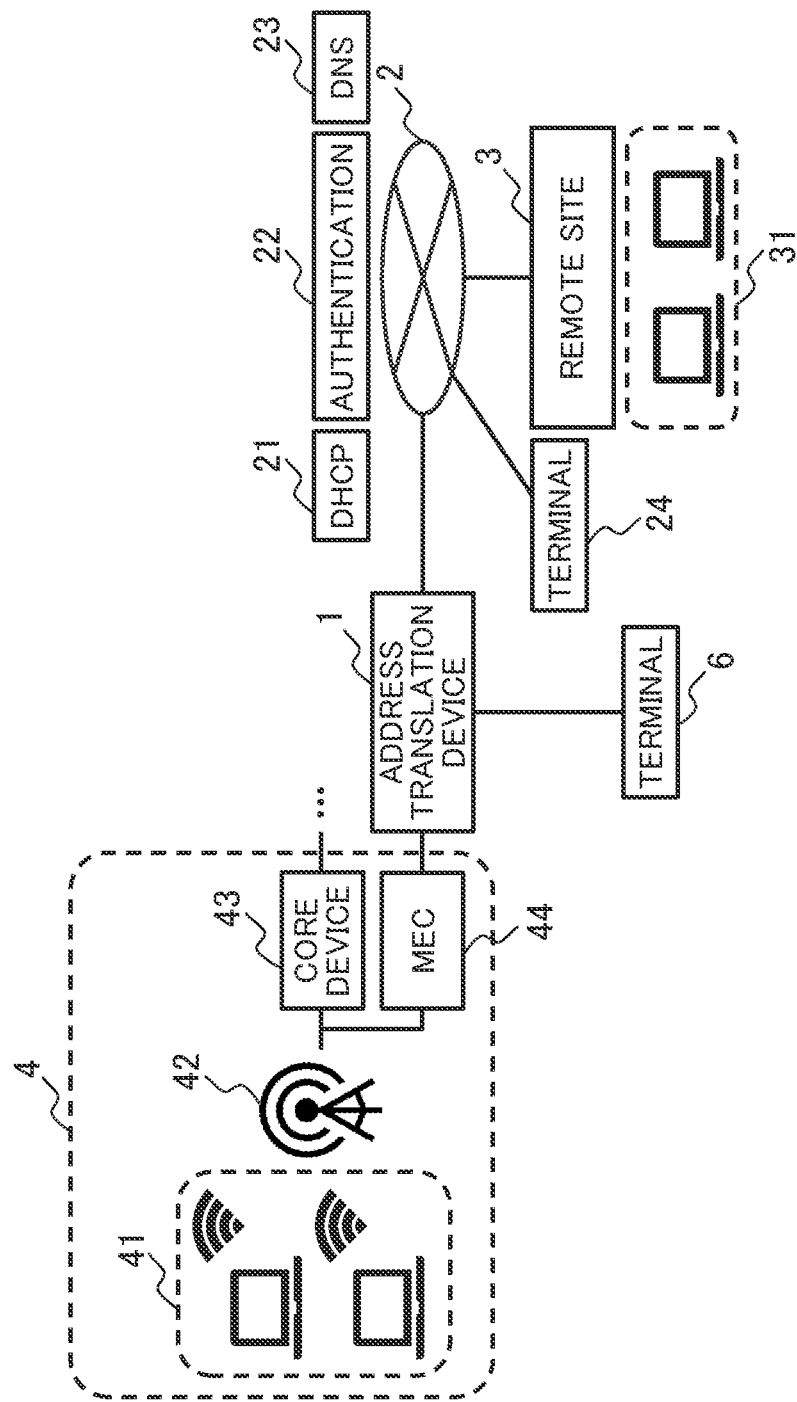
FIG. 2 is a diagram for showing another network configuration of the embodiment of the present invention.

FIG. 2 is a diagram for showing another network configuration of the embodiment of the present invention. In the following, differences in the network configuration between FIG. 2 and FIG. 1 will be mainly described, and constitutional elements having the same functions as those of the network shown in FIG. 1 will be denoted by the same reference numerals and the description thereof will be omitted.

In the network shown in FIG. 2, an MEC (multi-access edge computing) 44 is provided between the address translation device 1 and the base station device 42. The MEC 44 functions in place of some functions of the mobile core device 43 in the mobile network 4. In the case where the mobile core device is installed at a point remote from a local network, the MEC 44 terminates data communications from the mobile terminal and transfers the data to the local network, so that the communication time to the server 31 can be shortened.

Figure 3:
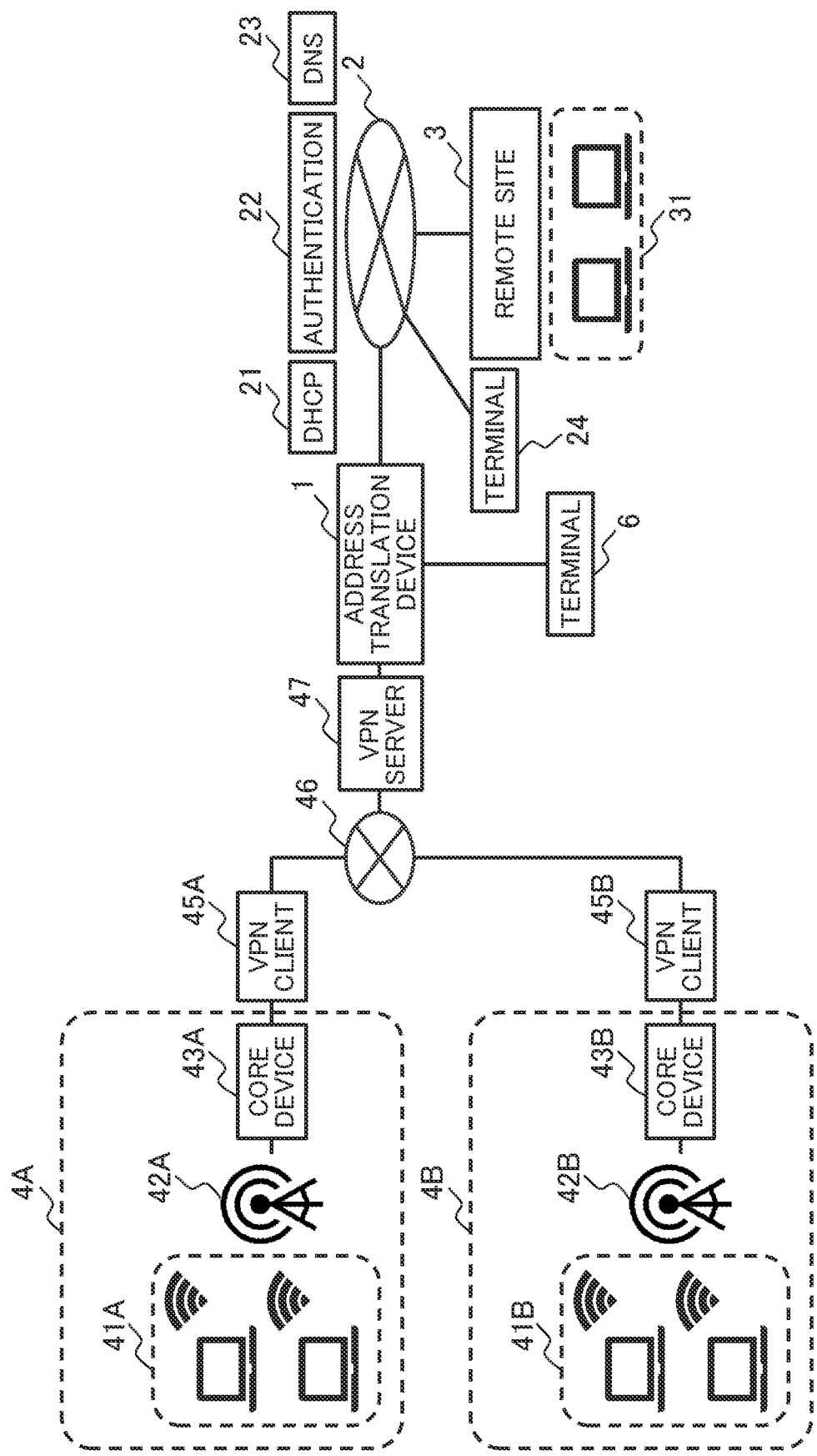
FIG. 3 is a diagram for showing still another network configuration of the embodiment of the present invention.

FIG. 3 is a diagram for showing still another network configuration of the embodiment of the present invention. In the following, differences in the network configuration between FIG. 3 and FIG. 1 will be mainly described, and constitutional elements having the same functions as those of the network shown in FIG. 1 will be denoted by the same reference numerals and the description thereof will be omitted.

The network shown in FIG. 3 is configured using the intra-network 2, a plurality of mobile networks 4A and 4B, and the address translation device 1 provided between the intra-network 2 and the mobile networks 4A and 4B. The intra-network 2 and the mobile networks 4A and 4B are connected to each other by a VPN (Virtual Private Network) on the Internet 46. In order to configure the VPN, a VPN server 47 is provided on the intra-network 2 side, and VPN clients 45A and 45B are provided on the mobile networks 4A and 4B side.

In the network shown in FIG. 3, even if the intra-network 2 and the mobile networks 4A and 4B are connected to each other via the Internet 46, communications can be separated for each of the mobile networks 4A and 4B, and secure communications can be performed between the mobile terminal 41 and the intranet server 31. In addition, an address can be appropriately translated between the intra-network 2 and the mobile networks 4A and 4B even in such an environment.

Figure 4:
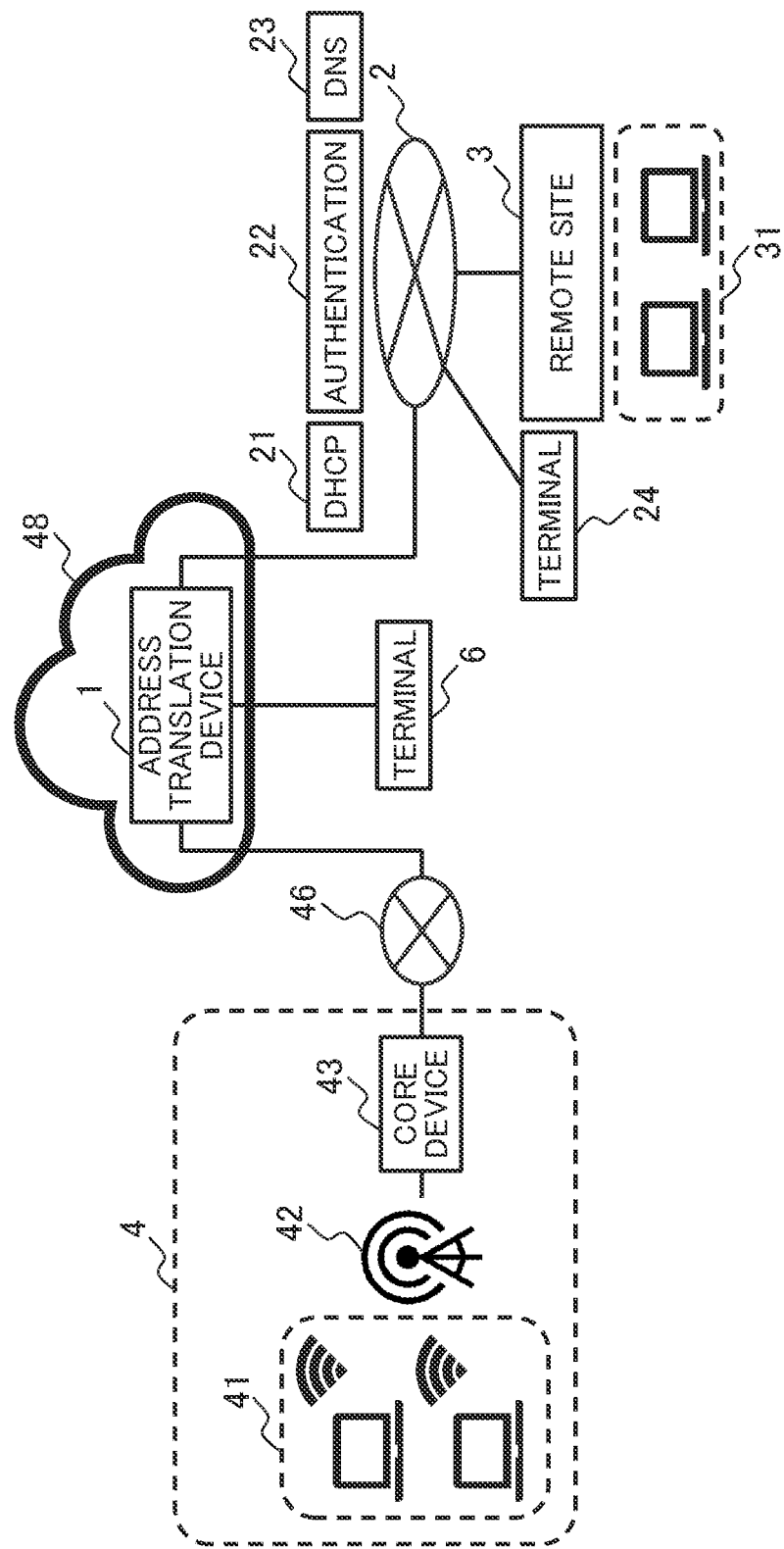
FIG. 4 is a diagram for showing still another network configuration of the embodiment of the present invention.

FIG. 4 is a diagram for showing still another network configuration of the embodiment of the present invention. In the following, differences in the network configuration between FIG. 4 and FIG. 1 will be mainly described, and constitutional elements having the same functions as those of the network shown in FIG. 1 will be denoted by the same reference numerals and the description thereof will be omitted.

In the network shown in FIG. 4, the intra-network 2 and the mobile network 4 are connected to each other via the Internet 46. In addition, the address translation device 1 is provided on a cloud 48. The address translation device 1 may be provided on the cloud as shown in FIG. 4, or may be provided on-premises as shown in another example. With such a configuration, the address translation device 1 can be provided by Software-as-a-Service (SaaS) manner, and the address translation device 1 can be aggregated even in the case where a plurality of networks is connected.

Although various network configurations have been described using FIG. 1 to FIG. 4, each embodiment to be described later can be applied to any network configuration.

First Embodiment

Figures 5, 6:
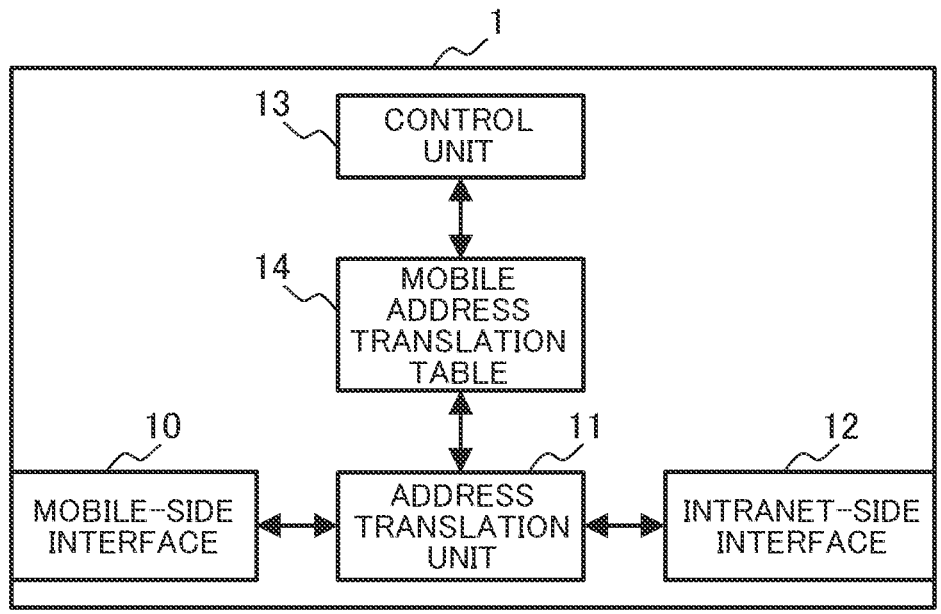
FIG. 5 is a diagram for showing a configuration of an address translation device 1 of a first embodiment.
FIG. 6 is a diagram for showing a configuration example of a mobile address translation table of the first embodiment.

FIG. 5 is a diagram for showing a configuration of an address translation device 1 of a first embodiment.

The address translation device 1 includes a mobile-side interface 10, an address translation unit 11, an intranet-side interface 12, a control unit 13, and a mobile address translation table 14. The mobile-side interface 10 is an interface for connecting the address translation device 1 to the mobile network 4. The intranet-side interface 12 is an interface for connecting the address translation device 1 to the intra-network 2. The address translation unit 11 mutually translates an address (the MAC address and the IP address of the layer 2) used in the intra-network 2 and an address (the IP address of the layer 3) used in the mobile network 4, which are included in a packet mutually transferred between the intra-network 2 and the mobile network 4. In a normal packet transferred between networks, an address described in a packet header is translated, and in a DNS response packet, an address described in a body part of the packet is translated. The mobile address translation table 14 holds information for translating a mobile-side IP address used in the mobile network 4 and an intranet-side MAC address and an intranet-side IP address used in the intra-network 2. The configuration of the mobile address translation table 14 will be described later with reference to FIG. 6. The control unit 13 controls an operation of the address translation device 1 such as controlling data registration to the mobile address translation table 14.

FIG. 6 is a diagram for showing a configuration example of the mobile address translation table 14 of the first embodiment.

The mobile address translation table 14 associates and records a mobile-side IP address 51 used in the mobile network 4, an intranet-side MAC address 52 used in the intra-network 2, and an intranet-side IP address 53 used in the intra-network 2.

Figure 7:
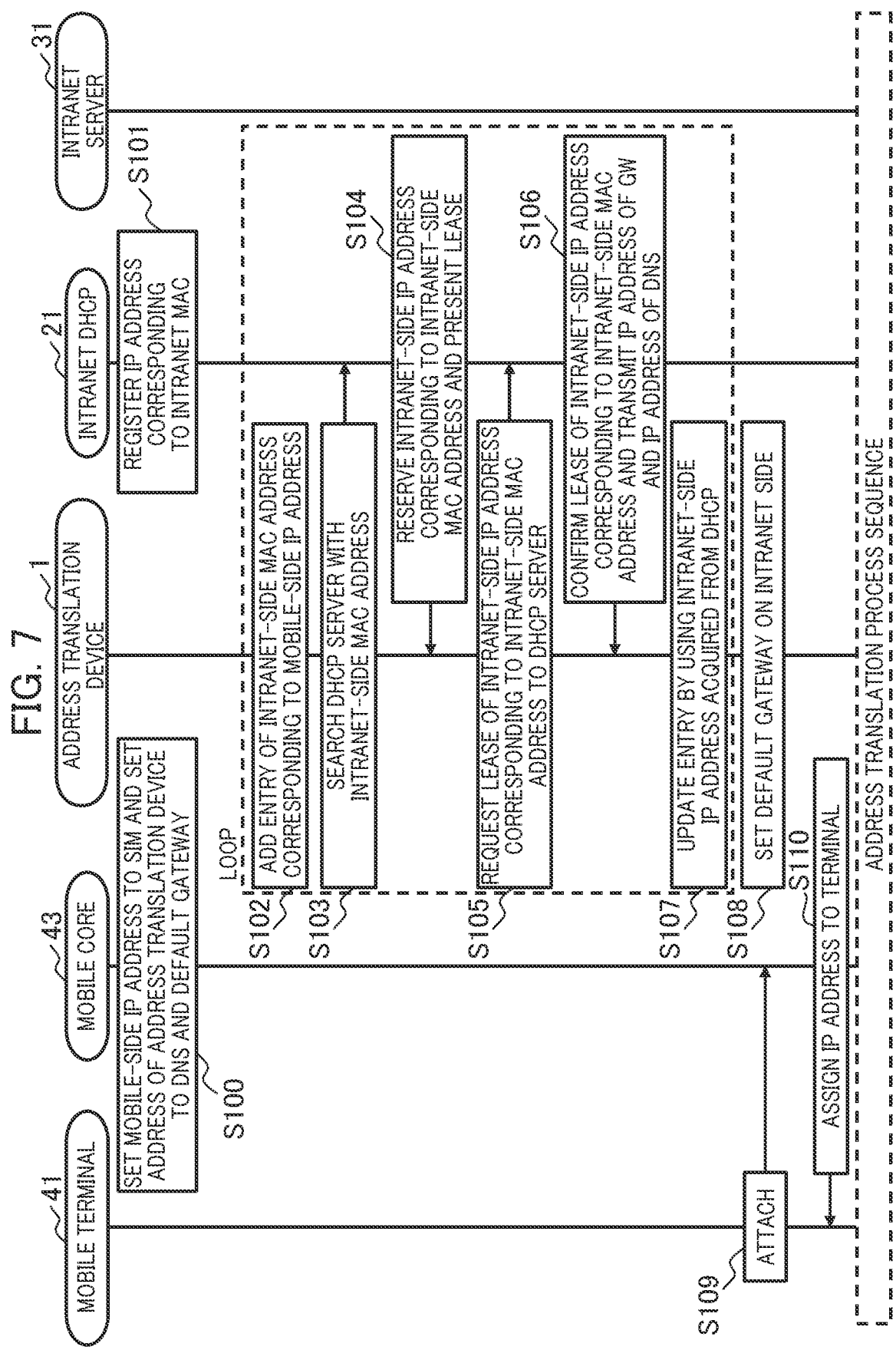
FIG. 7 is a sequence diagram of an address registration process of the first embodiment.

FIG. 7 is a sequence diagram of an address registration process of the first embodiment. It should be noted that in the following sequence diagram, the steps already described will be denoted by the same reference numerals and the illustration thereof will be omitted.

First, the mobile core device 43 sets the mobile-side IP address to identification information (for example, IMSI) assigned to the SIM attached to the mobile terminal 41, and sets the address of the address translation device 1 to the address of the DNS server and the address of the default gateway (S100). In addition, the DHCP server 21 accepts registration of an IP address corresponding to the intranet MAC address (S101). In the registration of the IP address, information input to the terminal 24 may be accepted, or an address dynamically assigned by using a DHCP function may be registered.

Thereafter, the address translation device 1 repeats the loop of Steps S102 to S107 for each mobile terminal 41 to be registered. First, the address translation device 1 accepts an entry of the intranet-side MAC address corresponding to the mobile-side IP address by a setting input from the terminal 6, and adds the entry to the mobile address translation table 14 (S102). Next, the address translation device 1 searches the DHCP server 21 with the intranet-side MAC address (S103).

The DHCP server 21 reserves the intranet-side IP address corresponding to the intranet-side MAC address, and presents a lease of the intranet-side IP address (S104). The address translation device 1 requests a lease of the intranet-side IP address corresponding to the intranet-side MAC address with the lease presented to the DHCP server 21 (S105). The DHCP server confirms the lease of the intranet-side IP address corresponding to the intranet-side MAC address, and transmits the IP address of the gateway and the IP address of the DNS server 23 together with the intranet-side IP address associated to the intranet-side MAC address (S106). The address translation device 1 updates the entry of the mobile address translation table 14 by using the intranet-side IP address acquired from the DHCP server 21 (S107).

After the completion of the loop process, the address translation device 1 sets the default gateway on the intranet side to the IP address of the gateway acquired from the DHCP server 21 (S108).

When the mobile terminal 41 is attached to the mobile core device 43 at the time of starting communications (S109), a mobile-side IP address is assigned (S110). If the mobile terminal 41 is attached to the mobile core device 43 after an address is registered in the address translation device 1, a mobile-side IP address with which a set of an intranet-side MAC address and an intranet-side IP address is associated is assigned.

Figure 12:
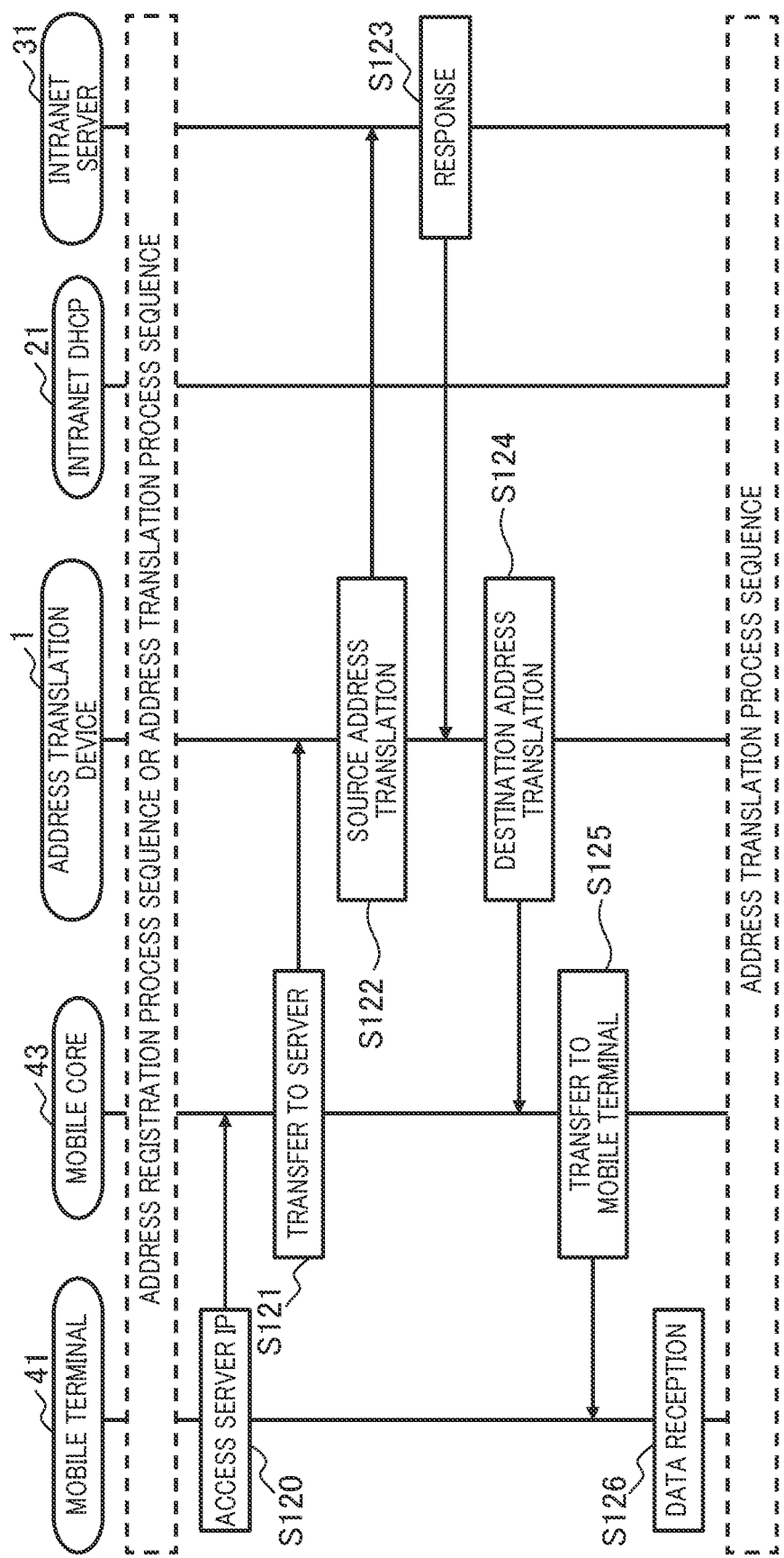
FIG. 12 is a sequence diagram of an address translation process of the first embodiment.

The address registration process is completed at this time, and the address translation device 1 can start an address translation sequence (see FIG. 12).

Figure 8:
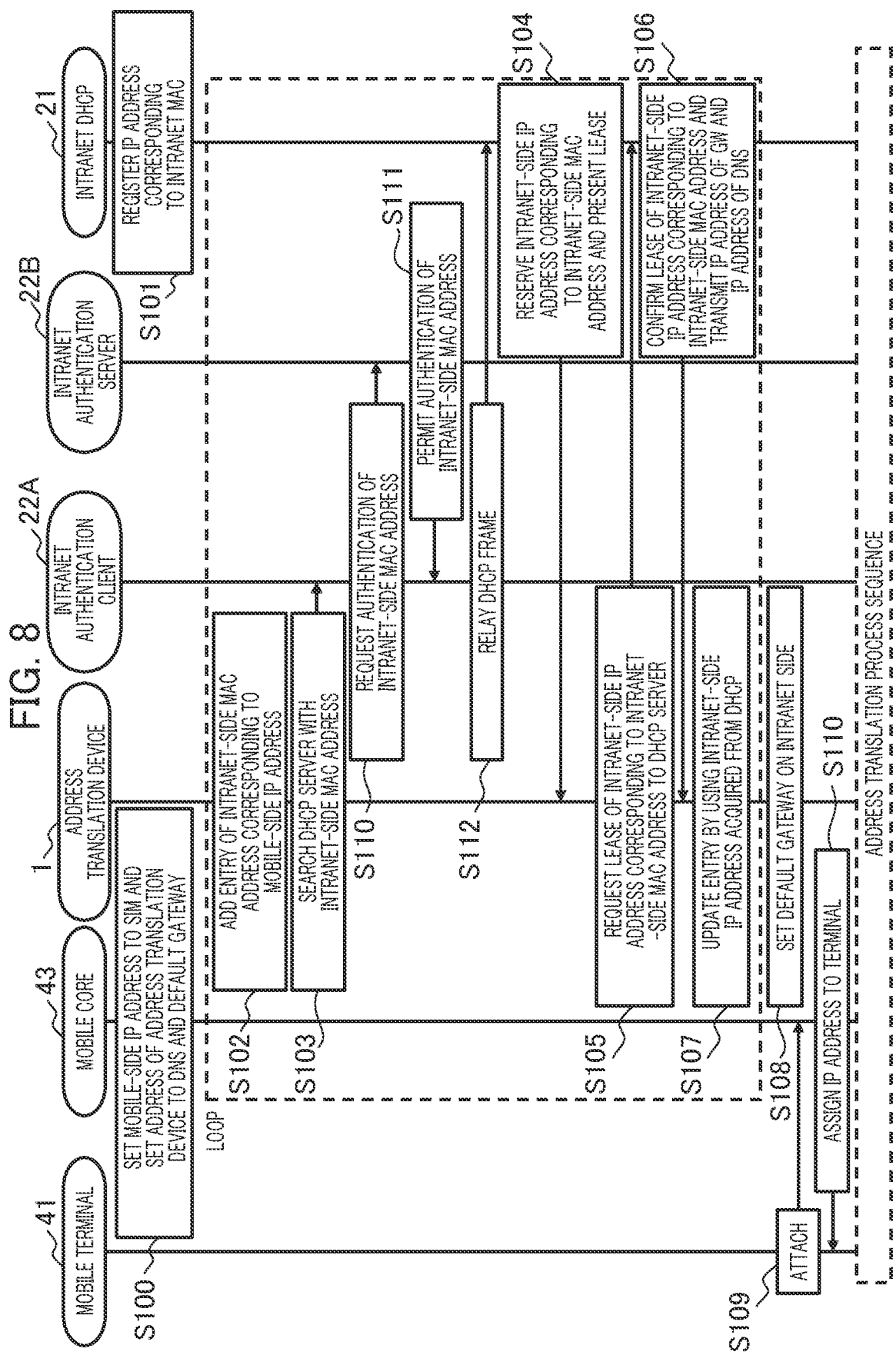
FIG. 8 is a sequence diagram of the address registration process in the case where a mobile terminal is authenticated by an intra-network of the first embodiment.

FIG. 8 is a sequence diagram of the address registration process in the case where the mobile terminal 41 is authenticated by the intra-network 2 of the first embodiment.

First, the mobile core device 43 sets the mobile-side IP address to identification information (for example, IMSI) assigned to the SIM attached to the mobile terminal 41, and sets the address of the address translation device 1 to the address of the DNS server and the address of the default gateway (S100). In addition, the DHCP server 21 accepts registration of an IP address corresponding to the intranet MAC address (S101). In the registration of the IP address, information input to the terminal 24 may be accepted, or an address assigned by using a DHCP function may be registered.

Thereafter, the address translation device 1 repeats the loop of Steps S102 to S107 for each mobile terminal 41 to be registered. First, the address translation device 1 accepts an entry of the intranet-side MAC address assigned to the mobile-side IP address by a setting input from the terminal 6, and adds the entry to the mobile address translation table 14 (S102). Next, the address translation device 1 searches the DHCP server 21 with the intranet-side MAC address (S103).

When capturing a DHCP search request transmitted from the address translation device 1 to the DHCP server 21, the intranet authentication client 22A requests authentication of the intranet-side MAC address included in the search request to the intranet authentication server 22B (S110). The intranet authentication server 22B checks the intranet-side MAC address for which the authentication is requested against an authentication list to determine whether or not the authentication is permitted, and transmits authentication permission to the intranet authentication client 22A (S111). When receiving the authentication permission from the intranet authentication client 22B, the intranet authentication client 22A relays a DHCP frame including the permitted intranet-side MAC address to the DHCP server 21 (S112). By the above process, the use of an illegal MAC address in the intra-network 2 can be prohibited.

The DHCP server 21 reserves the intranet-side IP address corresponding to the intranet-side MAC address, and presents a lease of the intranet-side IP address (S104). The address translation device 1 requests a lease of the intranet-side IP address corresponding to the intranet-side MAC address with the lease presented to the DHCP server 21 (S105). The DHCP server confirms the lease of the intranet-side IP address corresponding to the intranet-side MAC address, and transmits the IP address of the gateway and the IP address of the DNS server 23 together with the intranet-side IP address (S106). The address translation device 1 updates the entry of the mobile address translation table 14 by using the intranet-side IP address acquired from the DHCP server 21 (S107).

After the completion of the loop process, the address translation device 1 sets the default gateway on the intranet side to the IP address of the gateway acquired from the DHCP server 21 (S108).

When the mobile terminal 41 is attached to the mobile core device 43 at the time of starting communications (S109), a mobile-side IP address is assigned (S110). If the mobile terminal 41 is attached to the mobile core device 43 after an address is registered in the address translation device 1, a mobile-side IP address with which a set of an intranet-side MAC address and an intranet-side IP address is associated is assigned.

The address registration process is completed at this time, and the address translation device 1 can start an address translation sequence (see FIG. 12).

Figure 9:
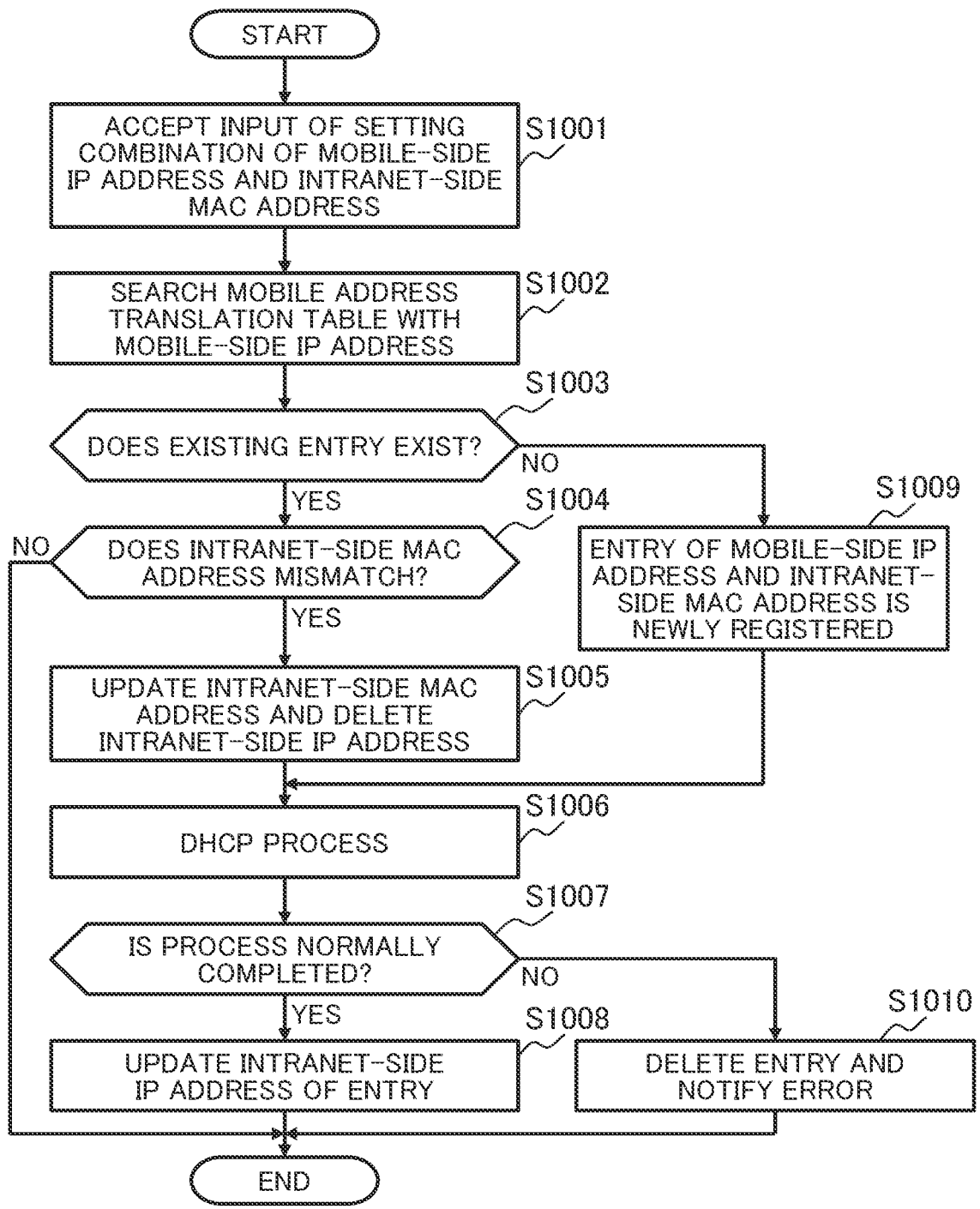
FIG. 9 is a flowchart of the address registration process of the first embodiment.

FIG. 9 is a flowchart of the address registration process of the first embodiment, and FIGS. 10A and 10B are diagrams each showing changes in the mobile address translation table 14 in the address registration process of the first embodiment.

First, the control unit 13 of the address translation device 1 accepts an input of setting a combination of a mobile-side IP address and an intranet-side MAC address from the terminal 6 (S1001). The administrator operates an interface screen (a GUI screen of FIG. 11A or a CLI screen of FIG. 11B) displayed on the terminal 6 to input the combination of the mobile-side IP address and the intranet-side MAC address, and sets an acquisition method of the intranet-side IP address.

The control unit 13 searches the mobile address translation table 14 with the mobile-side IP address (S1002), and determines whether or not an entry including the mobile-side IP address exists (S1003).

If there is no entry including the mobile-side IP address, an entry of a combination of the mobile-side IP address and the intranet-side MAC address is newly registered in the mobile address translation table 14 (S1009).

On the other hand, if there is an entry including the mobile-side IP address, it is determined whether or not the intranet-side MAC addresses match each other (S1004). If the intranet-side MAC addresses match each other (NO in S1004), the combination of the mobile-side IP address and the intranet-side MAC address has already been registered in the mobile address translation table 14, and thus the address registration process is terminated. On the other hand, if the intranet-side MAC addresses do not match each other (YES in S1004), the intranet-side MAC address corresponding to the mobile-side IP address is different, and thus the intranet-side MAC address is updated to delete the registered intranet-side IP address (S1005).

When Step S1005 or S1009 is completed, the combination of the mobile-side IP address and the intranet-side MAC address is registered in the mobile address translation table 14, and the intranet-side IP address is blank as shown in FIG. 10A.

Thereafter, the control unit 13 performs a DHCP process, and acquires the intranet-side IP address corresponding to the intranet-side MAC address from the DHCP server 21 (S1006). If the DHCP process is normally completed (YES in S1007), the entry is updated with the intranet-side IP address acquired from the DHCP server 21 (S1008). When Step S1008 is completed, the combination of the mobile-side IP address, the intranet-side MAC address, and the intranet-side IP address is registered in the mobile address translation table 14 as shown in FIG. 10B.

On the other hand, if the DHCP process is abnormally completed (NO in S1007), the entry is deleted from the mobile address translation table 14, and an error is notified to the terminal 6 (S1010).

Figure 11A:
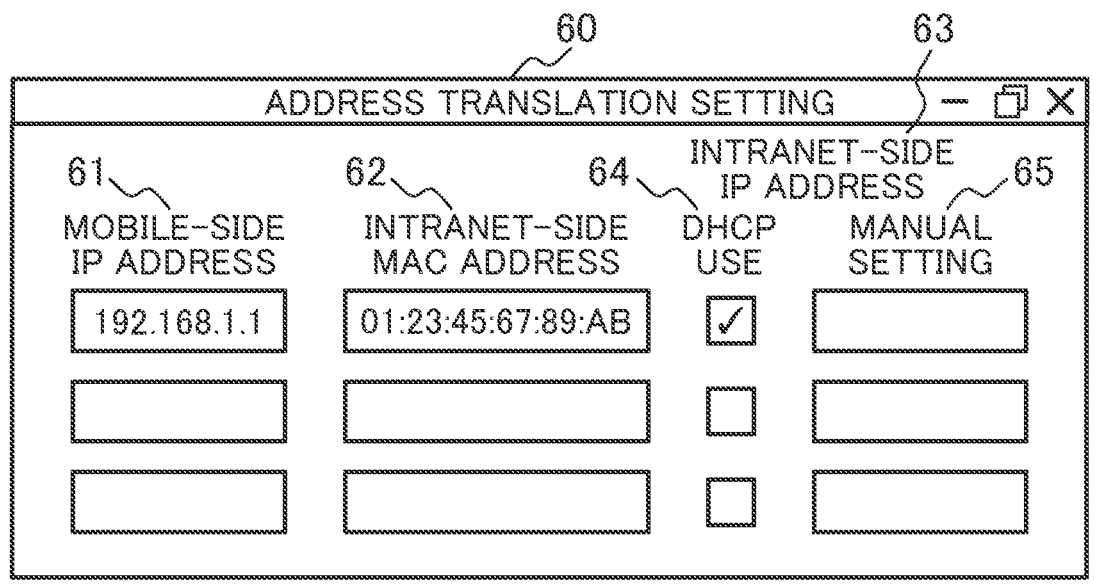
FIGS. 11A and 11B are diagrams each showing an interface screen used in the address registration process of the first embodiment.
Figure 11B:
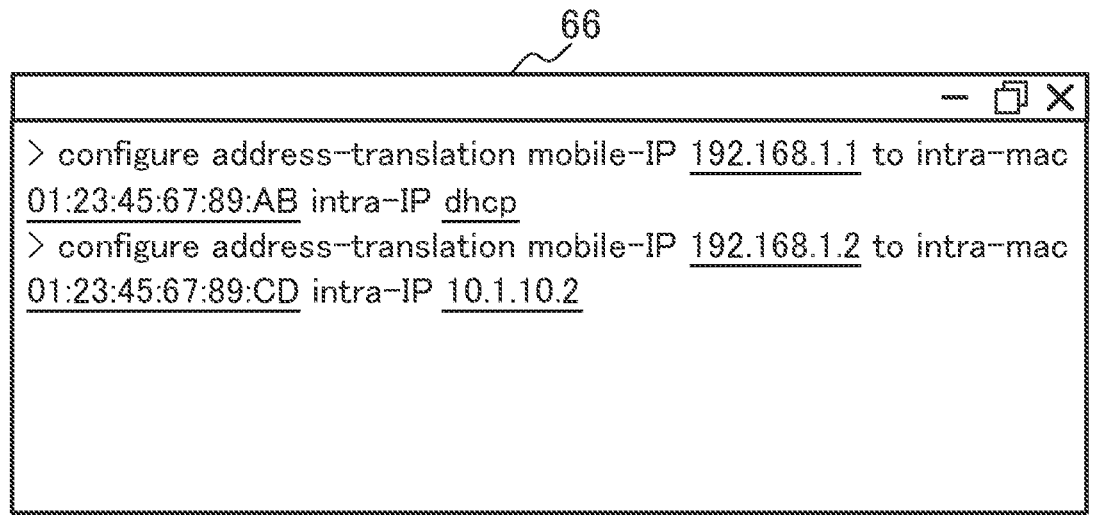

FIGS. 11A and 11B are diagrams each showing an interface screen used in the address registration process of the first embodiment.

On a GUI screen 60 shown in FIG. 11A, a combination of a mobile-side IP address and an intranet-side MAC address is input into a mobile-side IP address input field 61 and an intranet-side MAC address input field 62. An intranet-side IP address acquisition method setting field 63 is provided with a DHCP use check field 64 selected in the case where an intranet-side IP address is acquired by using the DHCP and a manual setting field 65 in which the intranet-side IP address can be input. Using this interface, the administrator inputs a combination of a mobile-side IP address and an intranet-side MAC address and sets a method of acquiring an intranet-side IP address.

In addition, as in a CLI screen 66 shown in FIG. 11B, the administrator may input a combination of a mobile-side IP address and an intranet-side MAC address by using a command and an argument to set a method of acquiring an intranet-side IP address.

FIG. 12 is a sequence diagram of an address translation process of the first embodiment.

The address translation process shown in FIG. 12 is executed after an address registration process sequence or other address translation sequences.

First, the mobile terminal 41 transmits an access request to the intranet server 31 by using the intranet-side IP address (S120). The mobile core device 43 transfers the request transmitted from the mobile terminal 41 to the intranet server (S121). The address translation device 1 translates the address of the mobile terminal 41 of the transmission source of the request from the mobile-side IP address into an intranet-side MAC address and an intranet-side IP address, and transfers the request transmitted from the mobile terminal 41 to the intranet server 31 (S122).

After executing a predetermined process for the request, the intranet server 31 returns a response to the mobile terminal 41 (S123). The response from the intranet server 31 is captured by the address translation device 1. The address translation device 1 translates the destination address of the response from the intranet-side MAC address and the intranet-side IP address into the mobile-side IP address, and transfers the response from the intranet server 31 to the mobile terminal 41 (S124). The mobile core device 43 transfers the response from the intranet server 31 transferred from the address translation device 1 to the mobile terminal 41 (S125).

The mobile terminal 41 can receive the response from the intranet server 31 by the above process (S126).

Thereafter, the address translation sequence is repeated for each access request from the mobile terminal 41.

Figure 13:
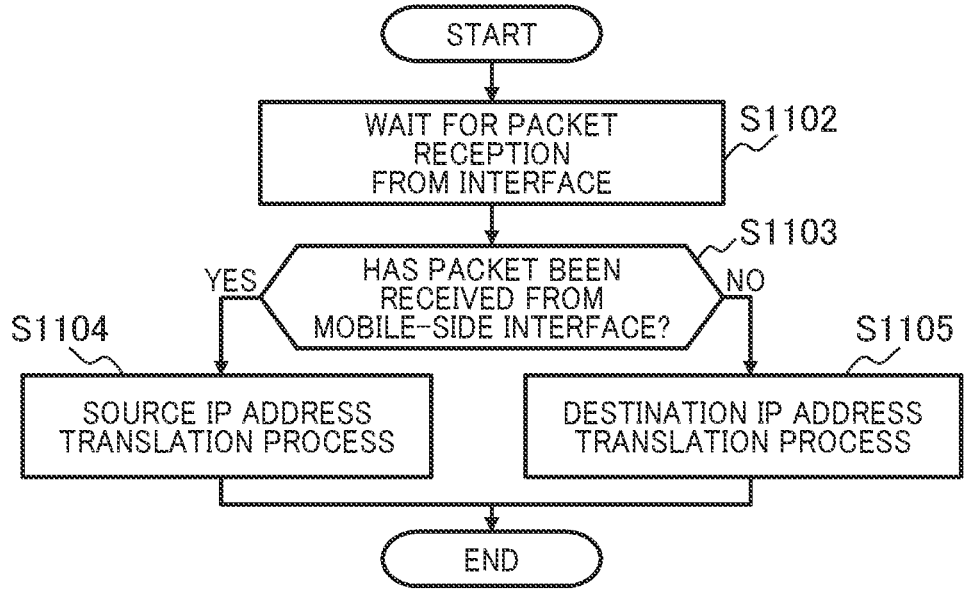
FIG. 13 is a flowchart of the address translation process of the first embodiment.

FIG. 13 is a flowchart of the address translation process of the first embodiment.

First, the address translation unit 11 waits for packet reception from the mobile-side interface 10 or the intranet-side interface 12 (S1102). The address translation unit 11 determines the interface that has received the packet (S1103). If the interface that has received the packet is the mobile-side interface 10 (YES in S1103), a source IP address translation process (see FIG. 14) is executed (S1104). On the other hand, if the interface that has received the packet is the intranet-side interface 12 (NO in S1103), a destination IP address translation process (see FIG. 15) is executed (S1105).

Figure 14:
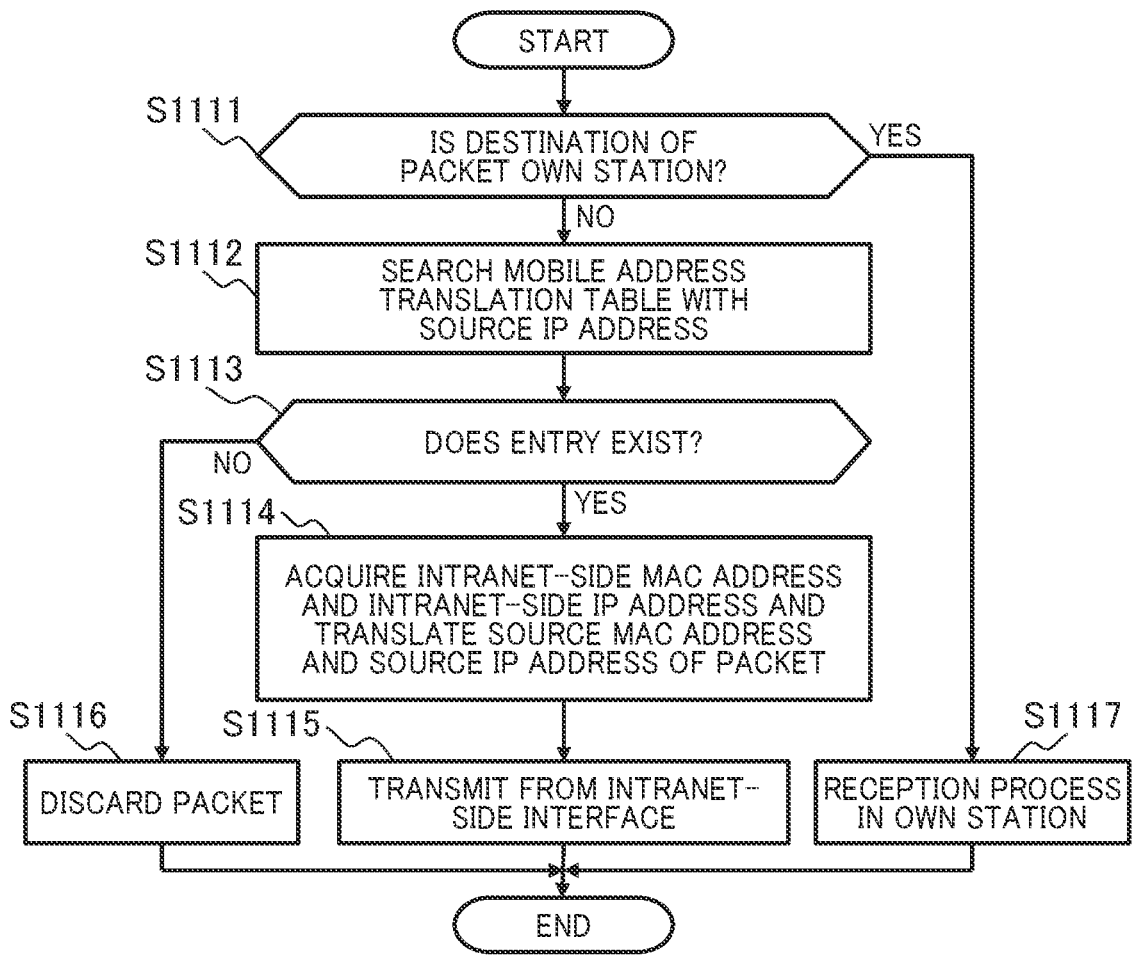
FIG. 14 is a flowchart of a source IP address translation process of the first embodiment.

FIG. 14 is a flowchart of the source IP address translation process (S1104) of the first embodiment, and the source address of a packet transmitted from the mobile network 4 to the intra-network 2 is translated.

The address translation unit 11 determines whether or not the destination of the received packet is the address translation device 1 (S1111). If the destination of the received packet is the address translation device 1, the control unit 13 executes a reception process (S1117). For example, a setting request or the like to the address translation device 1 is transferred by a packet addressed to the address translation device 1.

Thereafter, the mobile address translation table 14 is searched with the source IP address of the received packet (S1112). It is determined whether or not an entry including the mobile-side IP address of the transmission source exists (S1113).

If there is no entry including the mobile-side IP address of the transmission source, the received packet is illegal, and thus the received packet is discarded (S1116).

On the other hand, if there is an entry including the mobile-side IP address of the transmission source, the address translation unit 11 acquires the intranet-side MAC address and the intranet-side IP address corresponding to the mobile-side IP address of the transmission source, and translates the source address of the received packet from the mobile-side IP address into the intranet-side MAC address and the intranet-side IP address (S1114).

The intranet-side interface 12 transmits the packet with the address translated (S1115).

FIG. 15 is a flowchart of the destination IP address translation process (S1105) of the first embodiment, and the destination address of a packet transmitted from the intra-network 2 to the mobile network 4 is translated.

The address translation unit 11 determines whether or not the destination of the received packet is the address translation device 1 (S1121). If the destination of the received packet is the address translation device 1, the control unit 13 executes a reception process (S1127). For example, a setting request or the like to the address translation device 1 is transferred by a packet addressed to the address translation device 1.

Thereafter, the mobile address translation table 14 is searched with the destination IP address of the received packet (S1122). It is determined whether or not an entry including the intranet-side IP address of the destination exists (S1123).

If there is no entry including the intranet-side IP address of the destination, the destination address of the received packet cannot be translated into the mobile-side IP address, and thus the received packet is discarded (S1126).

On the other hand, if there is an entry including the intranet-side IP address of the destination, the address translation unit 11 acquires from the mobile address translation table 14 the mobile-side IP address corresponding to the intranet-side MAC address and the intranet-side IP address of the destination, and translates the destination address of the received packet from the intranet-side MAC address and the intranet-side IP address into the mobile-side IP address (S1124).

The mobile-side interface 10 transmits the packet with the address translated (S1125).

FIG. 16 is a diagram for showing an example of a DHCP server management screen 70 of the first embodiment.

The DHCP server management screen 70 has an IP address input field 71, a MAC address input field 72, a DHCP type setting field 73, a lease expiration setting field 74, and a control method setting field 75. An intranet-side IP address granted by the DHCP is input to the IP address input field 71. An intranet-side MAC address for requesting an address to the DHCP is input to the MAC address input field 72. In the DHCP type setting field 73, whether an IP address is statically or dynamically granted is set. In the lease expiration setting field 74, the lease time limit of the IP address to be granted is set, and unlimited time can be set. In the control method setting field 75, whether the authentication from the MAC address is permitted or denied is set.

It should be noted that whether or not authentication (S110 to S112 in FIG. 8) of a MAC address is required may be set on the DHCP server management screen 70.

The network system of the embodiment of the present invention described above can be applied to an intra-network connected to a local 5G network introduced in, for example, a factory. That is, introduction of standalone local 5G networks progresses at each workplace in the early days of the introduction of local 5G, but it is considered necessary to connect to existing systems. However, in order to connect the 5G network introduced in each workplace to the intra-network, it is necessary to match the operation policies and security levels of both. However, in the case of translating an address between networks, it is difficult to unitarily assign an address to the mobile terminal 41 in the ordinary NAT technique, but by using the address translation device 1 of the embodiment, authentication by the intranet-side MAC address of the mobile terminal 41 on the intra-network 2 side and management of an IP address by the DHCP can be performed, and the intranet-side address and connection of the mobile terminal 41 can be unitarily managed. Accordingly, security in the intra-network 2 can be secured, and measures (communication interruption and the like) can be taken when an accident occurs.

As described above, the address translation device 1 of the first embodiment of the present invention can translate the mobile-side IP address into the intranet-side MAC address, and can acquire the intranet-side IP address to manage the combination thereof. Therefore, each mobile terminal 41 in the mobile network can be managed on the intra-network 2 side. In addition, each mobile terminal 41 in the mobile network can be authenticated by using the authentication mechanism 22 on the intra-network 2 side. Even if a mobile terminal 41 with a low security level in the mobile network 2 is connected to the intra-network 2, it is possible to appropriately manage on the intra-network 2 side without adding a device to the intra-network 2, and the influence of the intra-network 2 on other terminals can be suppressed.

In addition, since the intranet-side IP address is acquired from the DHCP server 21 by using the MAC address of the intra-network 2, the administrator of the intra-network can control access from the mobile network 4 with the intranet-side IP address (see FIG. 16).

In addition, the address translation device 1 can respond to an ARP request for the address for the intranet of the mobile terminal 41 with the intranet-side MAC address, receive a packet addressed to the intranet-side MAC address, translate the address into the mobile-side IP address, and transfer the packet.

Second Embodiment

Next, a second embodiment of the present invention will be described. In the second embodiment, a NAT (Network Address Translation) technique is used to translate a mobile-side IP address and an intranet-side IP address. In the second embodiment, the same configurations and functions as those in the above-described first embodiment will be denoted by the same reference numerals, and the description thereof will be omitted.

Figures 17, 18, 19:
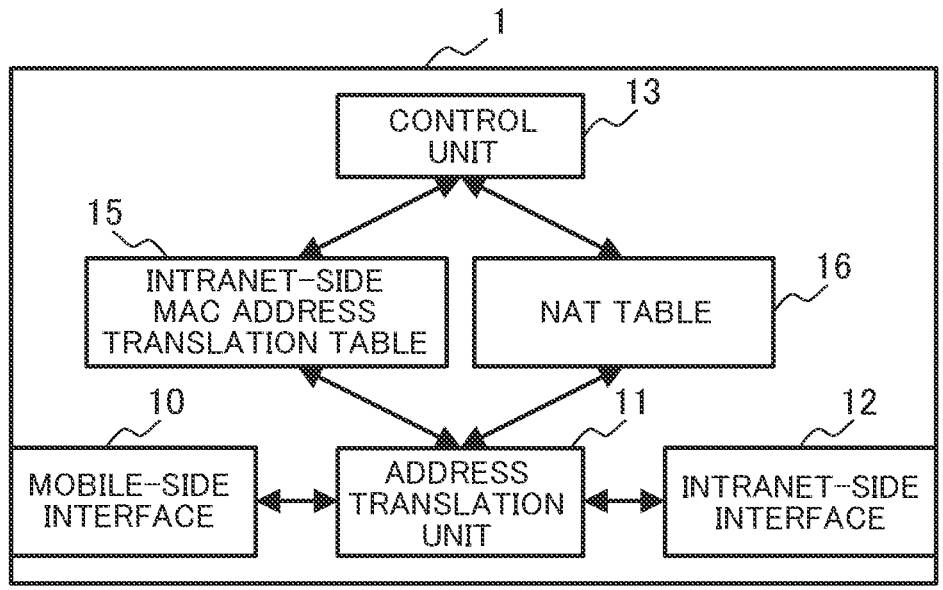
FIG. 17 is a diagram for showing a configuration of an address translation device of a second embodiment.
FIG. 18 is a diagram for showing a configuration example of an intranet-side MAC address translation table of the second embodiment.
FIG. 19 is a diagram for showing a configuration example of a NAT table of the second embodiment.

FIG. 17 is a diagram for showing a configuration of an address translation device 1 of the second embodiment.

The address translation device 1 of the second embodiment includes a mobile-side interface 10, an address translation unit 11, an intranet-side interface 12, a control unit 13, an intranet-side MAC address translation table 15, and a NAT table 16. The intranet-side MAC address translation table 15 holds information for translating a mobile-side IP address used in the mobile network 4 and an intranet-side MAC address used in the intra-network 2. The configuration of the intranet-side MAC address translation table 15 will be described later with reference to FIG. 18. The NAT table 16 holds information for translating a mobile-side IP address used in the mobile network 4 and an intranet-side IP address used in the intra-network 2. The configuration of the NAT table 16 will be described later with reference to FIG. 19.

FIG. 18 is a diagram for showing a configuration example of the intranet-side MAC address translation table 15 of the second embodiment.

The intranet-side MAC address translation table 15 associates and records a mobile-side IP address 101 used in the mobile network 4 and an intranet-side MAC address 102 used in the intra-network 2.

FIG. 19 is a diagram for showing a configuration example of the NAT table 16 of the second embodiment.

The NAT table 16 associates and records the mobile-side IP address 101 used in the mobile network 4 and an intranet-side IP address 103 used in the intra-network 2.

Figure 20:
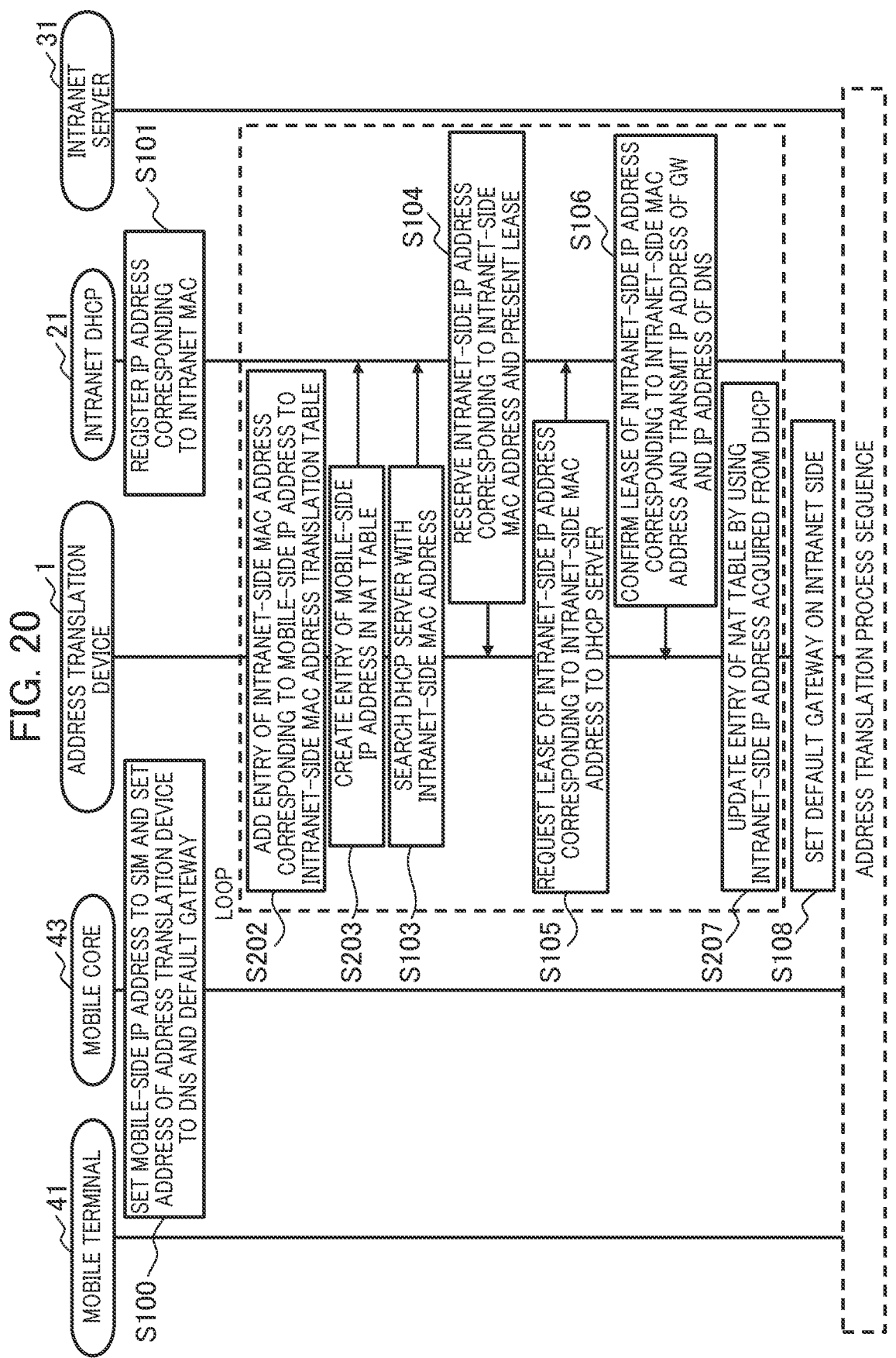
FIG. 20 is a sequence diagram of an address registration process of the second embodiment.

FIG. 20 is a sequence diagram of an address registration process of the second embodiment.

First, the mobile core device 43 sets the mobile-side IP address to identification information (for example, IMSI) assigned to the SIM attached to the mobile terminal 41, and sets the address of the address translation device 1 to the address of the DNS server and the address of the default gateway (S100). In addition, the DHCP server 21 accepts registration of an IP address corresponding to the intranet MAC address (S101). In the registration of the IP address, information input to the terminal 24 may be accepted, or an address dynamically assigned by using a DHCP function may be registered.

Thereafter, the address translation device 1 repeats the loop of Steps S202 to S207 for each mobile terminal 41 to be registered. First, the address translation device 1 accepts an entry of the intranet-side MAC address corresponding to the mobile-side IP address by a setting input from the terminal 6, adds the entry to the intranet-side MAC address translation table 15 (S202), and creates an entry of the mobile-side IP address in the NAT table 16. Next, the address translation device 1 searches the DHCP server 21 with the intranet-side MAC address (S103).

The DHCP server 21 reserves the intranet-side IP address corresponding to the intranet-side MAC address, and presents a lease of the intranet-side IP address (S104). The address translation device 1 requests a lease of the intranet-side IP address corresponding to the intranet-side MAC address with the lease presented to the DHCP server 21 (S105). The DHCP server confirms the lease of the intranet-side IP address corresponding to the intranet-side MAC address, and transmits the IP address of the gateway and the IP address of the DNS server 23 (S106). The address translation device 1 updates the entry of the NAT table 16 by using the intranet-side IP address acquired from the DHCP server 21 (S207).

After the completion of the loop process, the address translation device 1 sets the default gateway on the intranet side to the IP address of the gateway acquired from the DHCP server 21 (S108).

It should be noted that although not shown in the drawing, as similar to S109 to S110 of FIG. 7, when the mobile terminal is attached to the mobile core device 43 at the time of starting communications, a mobile-side IP address is assigned. If the mobile terminal 41 is attached to the mobile core device 43 after an address is registered in the address translation device 1, a mobile-side IP address with which a set of an intranet-side MAC address and an intranet-side IP address is associated is assigned.

The address registration process is completed at this time, and the address translation device 1 can start an address translation sequence (see FIG. 12).

It should be noted that in the second embodiment, the mobile terminal 41 may be authenticated by using the procedures of S110 to S112 of FIG. 8.

Figure 21:
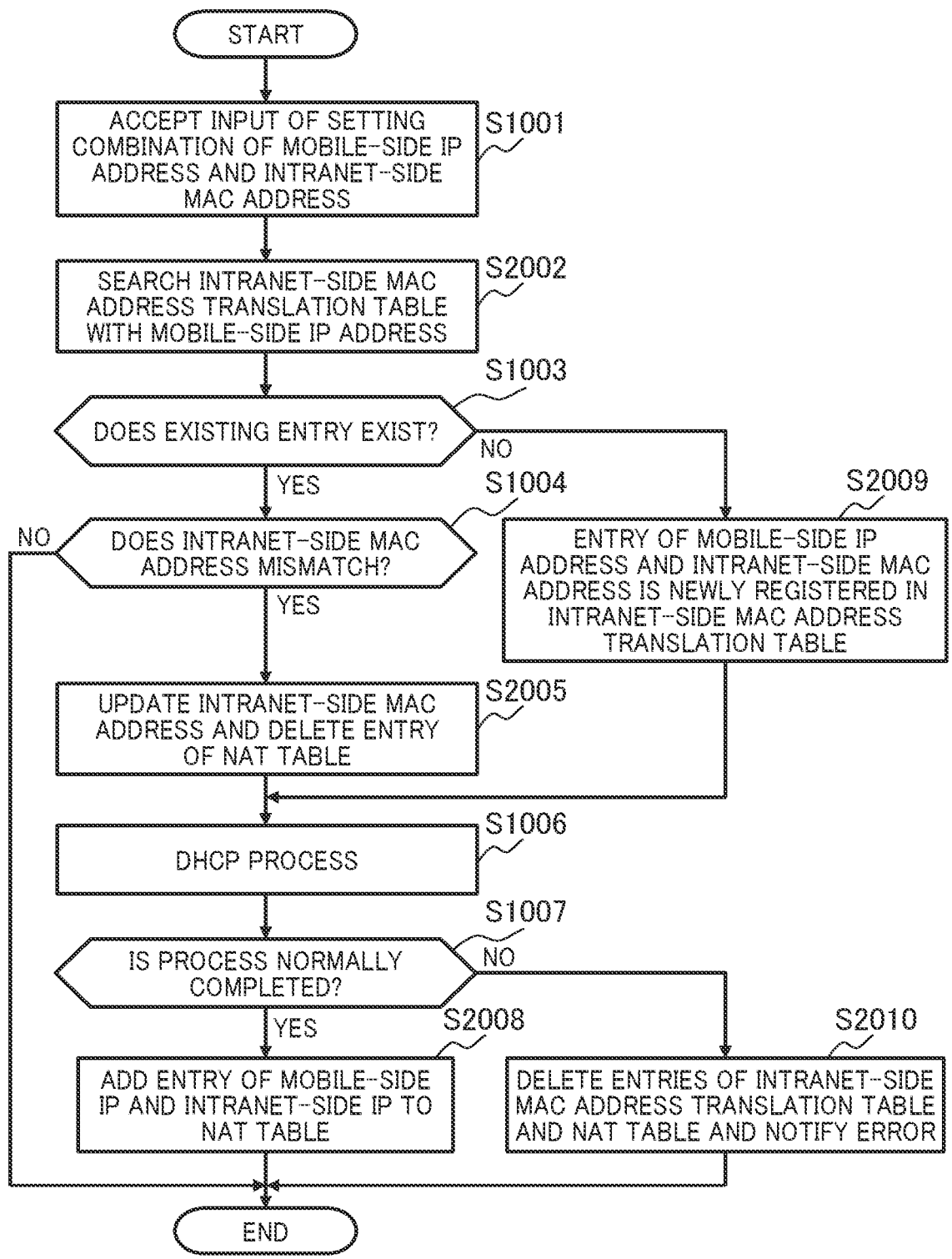
FIG. 21 is a flowchart of the address registration process of the second embodiment.

FIG. 21 is a flowchart of the address registration process of the second embodiment.

First, the control unit 13 of the address translation device 1 accepts an input of setting a combination of a mobile-side IP address and an intranet-side MAC address from the terminal 6 (S1001). The administrator operates an interface screen (a GUI screen of FIG. 11A or a CLI screen of FIG. 11B) displayed on the terminal 6 to input the combination of the mobile-side IP address and the intranet-side MAC address, and sets an acquisition method of the intranet-side IP address.

The control unit 13 searches the intranet-side MAC address translation table 15 with the mobile-side IP address (S2002), and determines whether or not an entry including the mobile-side IP address exists (S1003).

If there is no entry including the mobile-side IP address, an entry of a combination of the mobile-side IP address and the intranet-side MAC address is newly registered in the intranet-side MAC address translation table 15 (S2009).

On the other hand, if there is an entry including the mobile-side IP address, it is determined whether or not the intranet-side MAC addresses match each other (S1004). If the intranet-side MAC addresses match each other (NO in S1004), the combination of the mobile-side IP address and the intranet-side MAC address has already been registered in the intranet-side MAC address translation table 15, and thus the address registration process is terminated. On the other hand, if the intranet-side MAC addresses do not match each other (YES in S1004), the intranet-side MAC address corresponding to the mobile-side IP address is different, and thus the intranet-side MAC address is updated to delete the intranet-side IP address registered in the NAT table 16 (S2005).

When Step S2005 or S2009 is completed, the combination of the mobile-side IP address and the intranet-side MAC address is registered in the intranet-side MAC address translation table 15, and the intranet-side IP address in the NAT table 16 is blank.

Thereafter, the control unit 13 performs a DHCP process, and acquires the intranet-side IP address corresponding to the intranet-side MAC address from the DHCP server 21 (S1006). If the DHCP process is normally completed (YES in S1007), the entry of the intranet-side IP address acquired from the DHCP server 21 is added to the NAT table 16 (S2008). When Step S2008 is completed, the combination of the mobile-side IP address and the intranet-side MAC address is registered in the intranet-side MAC address translation table 15, and the combination of the mobile-side IP address and the intranet-side IP address is registered in the NAT table 16.

On the other hand, if the DHCP process is abnormally completed (NO in S1007), the entry is deleted from the intranet-side MAC address translation table 15 and the NAT table 16, and an error is notified to the terminal 6 (S2010).

The address translation process of the second embodiment is the same as those shown in FIG. 12 and FIG. 13 of the first embodiment, but the source IP address translation process (S1104) and the destination IP address translation process (S1105) are different.

Figure 22:
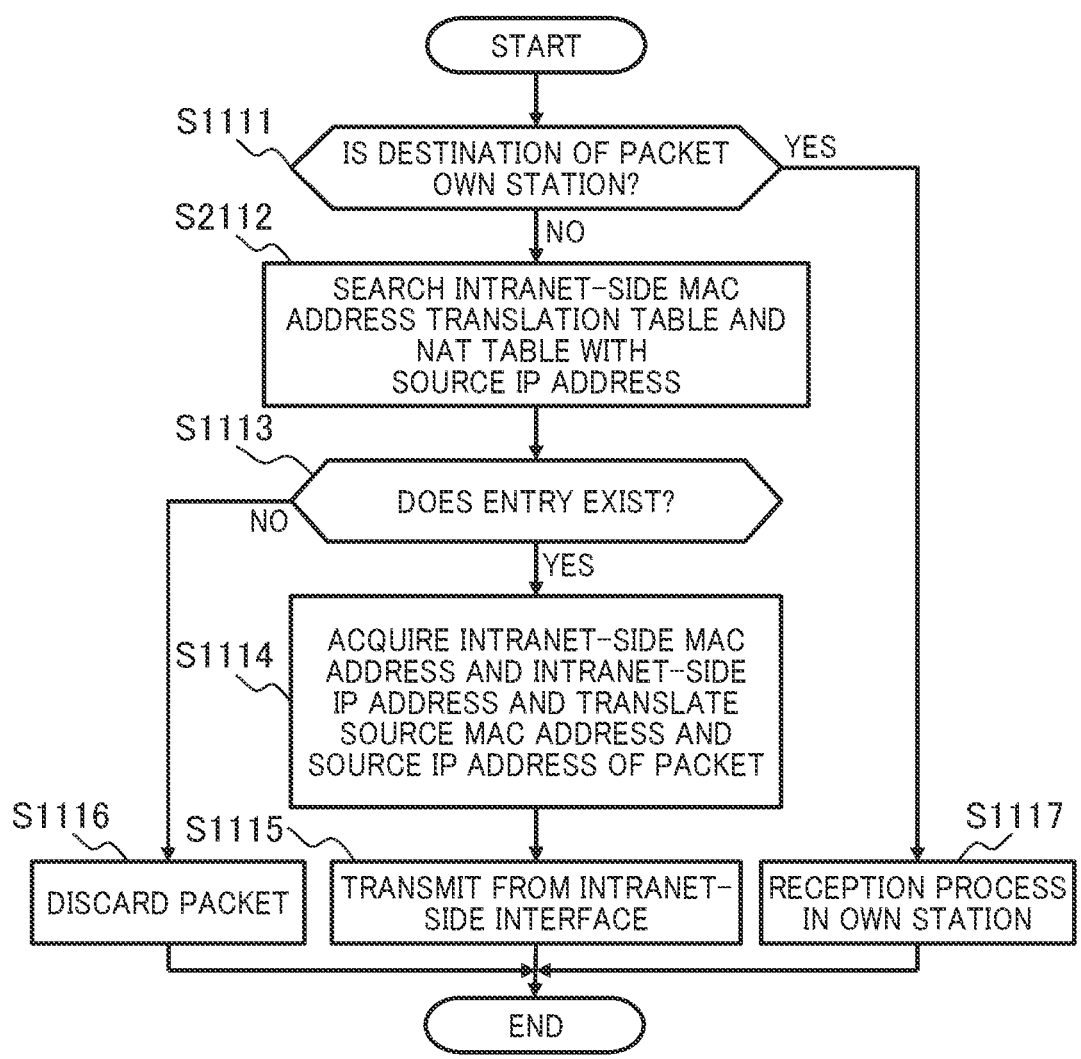
FIG. 22 is a flowchart of a source IP address translation process of the second embodiment.

FIG. 22 is a flowchart of the source IP address translation process (S1104) of the second embodiment, and the source address of a packet transmitted from the mobile network 4 to the intra-network 2 is translated.

The address translation unit 11 determines whether or not the destination of the received packet is the address translation device 1 (S1111). If the destination of the received packet is the address translation device 1, the control unit 13 executes a reception process (S1117). For example, a setting request or the like to the address translation device 1 is transferred by a packet addressed to the address translation device 1.

Thereafter, the intranet-side MAC address translation table 15 and the NAT table 16 are searched with the source IP address of the received packet (S2112). It is determined whether or not an entry including the mobile-side IP address of the transmission source exists (S1113).

If there is no entry including the mobile-side IP address of the transmission source, the received packet is illegal, and thus the received packet is discarded (S1116).

On the other hand, if there is an entry including the mobile-side IP address of the transmission source, the address translation unit 11 acquires the intranet-side MAC address and the intranet-side IP address corresponding to the mobile-side IP address of the transmission source, and translates the source address of the received packet from the mobile-side IP address into the intranet-side MAC address and the intranet-side IP address (S1114).

The intranet-side interface 12 transmits the packet with the address translated (S1115).

Figure 23:
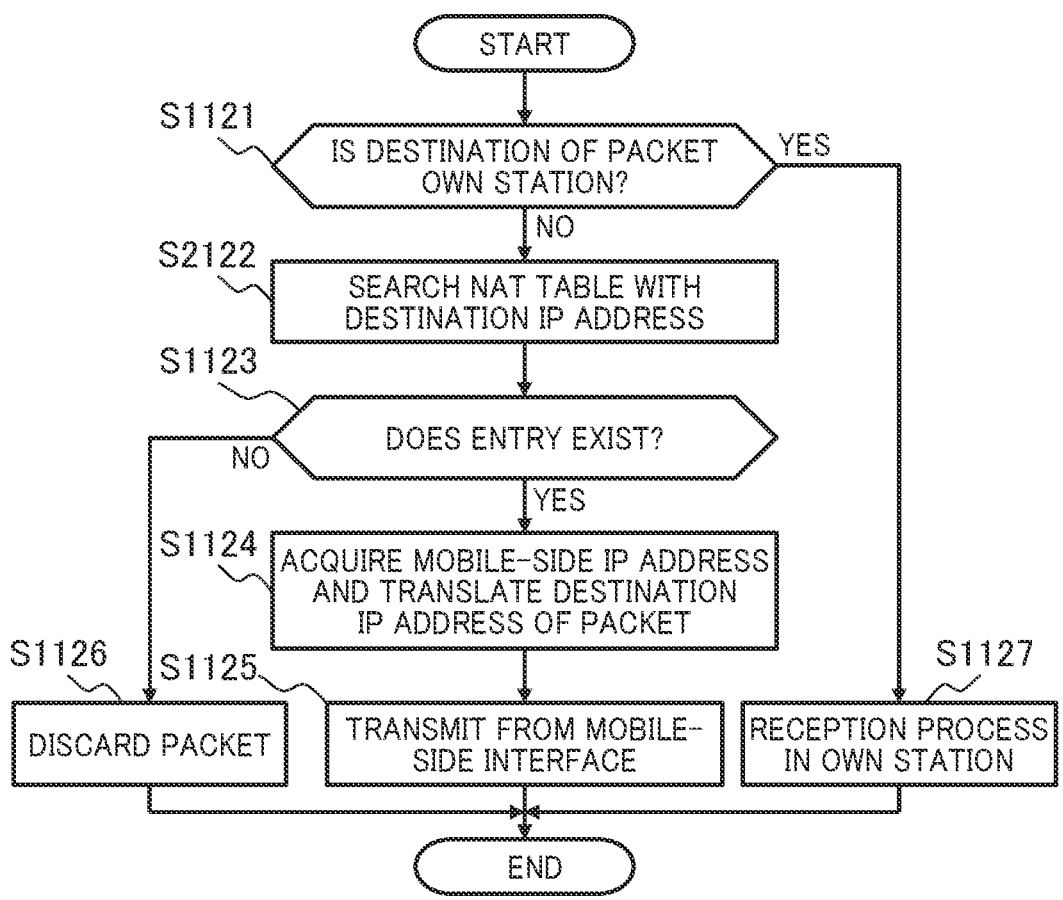
FIG. 23 is a flowchart of a destination IP address translation process of the second embodiment.

FIG. 23 is a flowchart of the destination IP address translation process (S1105) of the second embodiment, and the destination address of a packet transmitted from the intra-network 2 to the mobile network 4 is translated.

The address translation unit 11 determines whether or not the destination of the received packet is the address translation device 1 (S1121). If the destination of the received packet is the address translation device 1, the control unit 13 executes a reception process (S1127). For example, a setting request or the like to the address translation device 1 is transferred by a packet addressed to the address translation device 1.

Thereafter, the NAT table 16 is searched with the destination IP address of the received packet (S2122). It is determined whether or not an entry including the intranet-side IP address of the destination exists (S1123).

If there is no entry including the intranet-side IP address of the destination, the destination address of the received packet cannot be translated into the mobile-side IP address, and thus the received packet is discarded (S1126).

On the other hand, if there is an entry including the intranet-side IP address of the destination, the address translation unit 11 acquires from the NAT table 16 the mobile-side IP address corresponding to the intranet-side IP address of the destination, and translates the destination address of the received packet from the intranet-side MAC address and the intranet-side IP address into the mobile-side IP address (S1124).

The mobile-side interface 10 transmits the packet with the address translated (S1125).

As described above, according to the second embodiment of the present invention, the mobile-side IP address and the intranet-side IP address are translated by using the NAT technique, so that it is possible to realize a configuration to which the present invention can be applied while effectively using the functions of existing routers.

Third Embodiment

Next, a third embodiment of the present invention will be described. In the third embodiment, a virtual interface unit 18 is provided, and the virtual interface unit 18 executes a DHCP process. In the third embodiment, the same configurations and functions as those in the above-described first or second embodiment will be denoted by the same reference numerals, and the description thereof will be omitted.

Figure 24:
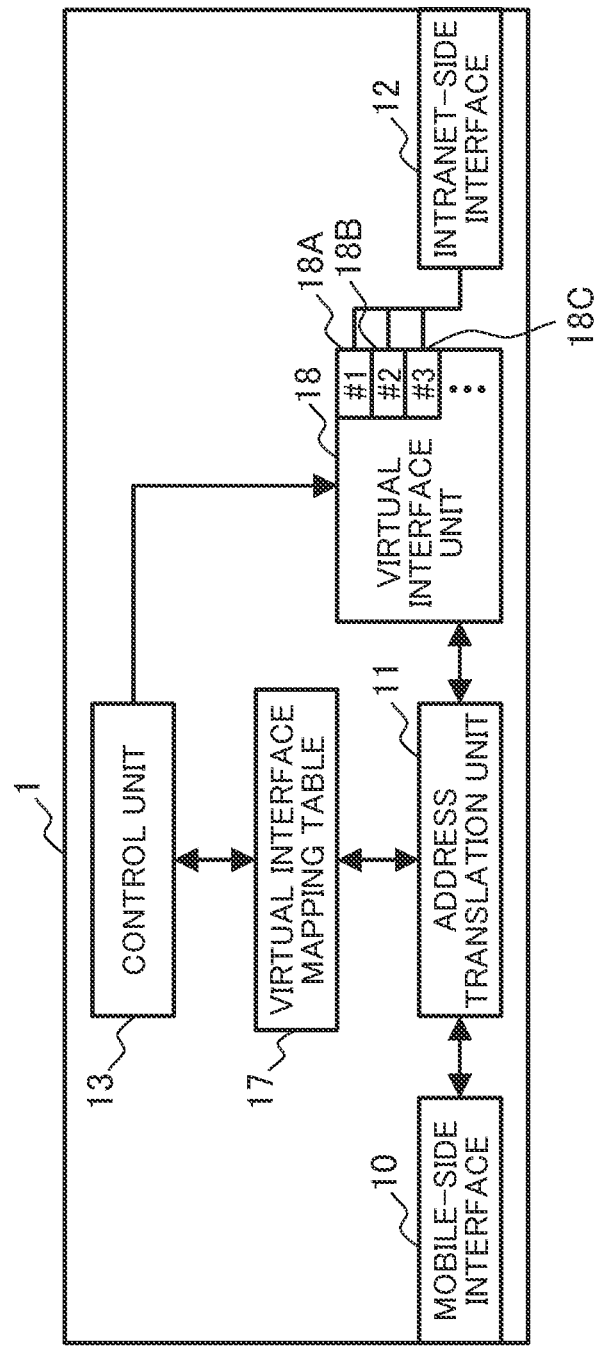
FIG. 24 is a diagram for showing a configuration of an address translation device of a third embodiment.

FIG. 24 is a diagram for showing a configuration of an address translation device 1 of the third embodiment.

The address translation device 1 of the third embodiment includes a mobile-side interface 10, an address translation unit 11, an intranet-side interface 12, a control unit 13, a virtual interface mapping table 17, and a virtual interface unit 18. The virtual interface mapping table 17 holds the correspondence between a mobile-side IP address and a virtual interface ID. The configuration of the virtual interface mapping table 17 will be described later with reference to FIG. 25. The virtual interface unit 18 has a plurality of virtual interfaces 18A, 18B, 18C, and the like, assigns the virtual interface to the mobile terminal 41, and communicates with the intra-network 2.

FIG. 25 is a diagram for showing a configuration example of the virtual interface mapping table 17 of the third embodiment.

The virtual interface mapping table 17 associates and records a mobile-side IP address 101 used in the mobile network and a virtual interface ID 104 that is identification information uniquely assigned to the virtual interface.

Figure 26:
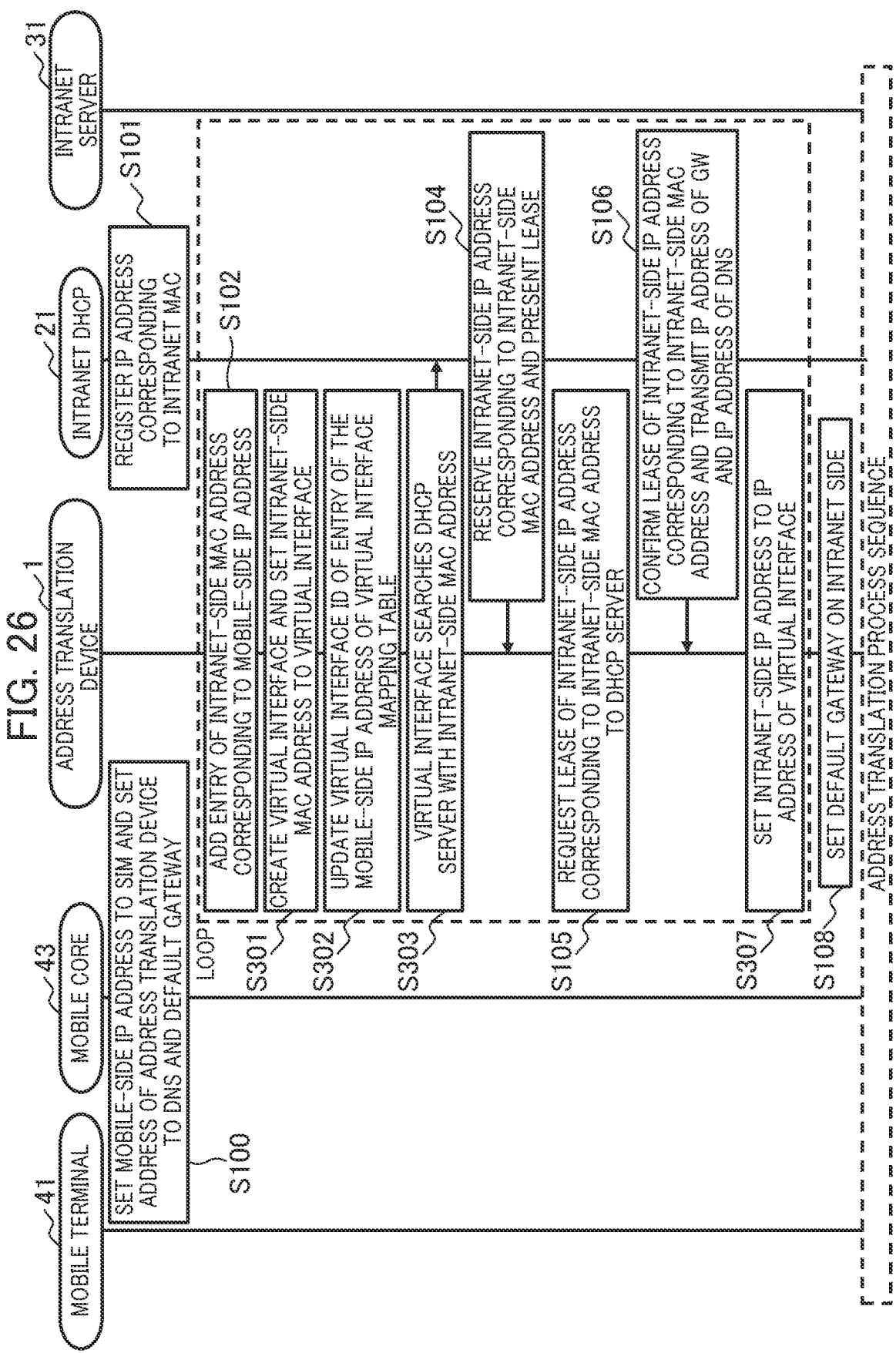
FIG. 26 is a sequence diagram of an address registration process of the third embodiment.

FIG. 26 is a sequence diagram of an address registration process of the third embodiment.

First, the mobile core device 43 sets the mobile-side IP address to identification information (for example, IMSI) assigned to the SIM attached to the mobile terminal 41, and sets the address of the address translation device 1 to the address of the DNS server and the address of the default gateway (S100). In addition, the DHCP server 21 accepts registration of an IP address corresponding to the intranet MAC address (S101). In the registration of the IP address, information input to the terminal 24 may be accepted, or an address dynamically assigned by using a DHCP function may be registered.

Thereafter, the address translation device 1 repeats the loop of Steps S102 to S107 for each mobile terminal 41 to be registered. First, the address translation device 1 accepts an entry of the intranet-side MAC address corresponding to the mobile-side IP address by a setting input from the terminal 6, and adds the entry to the mobile address translation table 14 (S102). Next, the address translation device 1 creates a virtual interface assigned to the mobile terminal 41, and sets the accepted intranet-side MAC address to the MAC address of the virtual interface (S301). Thereafter, the address translation device 1 updates the ID of the virtual interface of the entry of the mobile-side IP address in the virtual interface mapping table 17 (S302). Then, the virtual interface of the address translation device 1 searches the DHCP server 21 with the intranet-side MAC address (S303).

The DHCP server 21 reserves the intranet-side IP address corresponding to the intranet-side MAC address, and presents a lease of the intranet-side IP address (S104). The virtual interface of the address translation device 1 requests a lease of the intranet-side IP address corresponding to the intranet-side MAC address with the lease presented to the DHCP server 21 (S105). The DHCP server 21 confirms the lease of the intranet-side IP address corresponding to the intranet-side MAC address, and transmits the IP address of the gateway and the IP address of the DNS server 23 (S106). The virtual interface unit 18 of the address translation device 1 sets the intranet-side IP address acquired from the DHCP server 21 to the IP address of the virtual interface (S307).

After the completion of the loop process, the address translation device 1 sets the default gateway on the intranet side to the IP address of the gateway acquired from the DHCP server 21 (S108).

It should be noted that although not shown in the drawing, as similar to S109 to S110 of FIG. 7, when the mobile terminal is attached to the mobile core device 43 at the time of starting communications, a mobile-side IP address is assigned. If the mobile terminal 41 is attached to the mobile core device 43 after an address is registered in the address translation device 1, a mobile-side IP address with which a set of an intranet-side MAC address and an intranet-side IP address is associated is assigned.

The address registration process is completed at this time, and the address translation device 1 can start an address translation sequence (see FIG. 12).

It should be noted that in the third embodiment, the mobile terminal 41 may be authenticated by using the procedures of S110 to S112 of FIG. 8.

Figure 27:
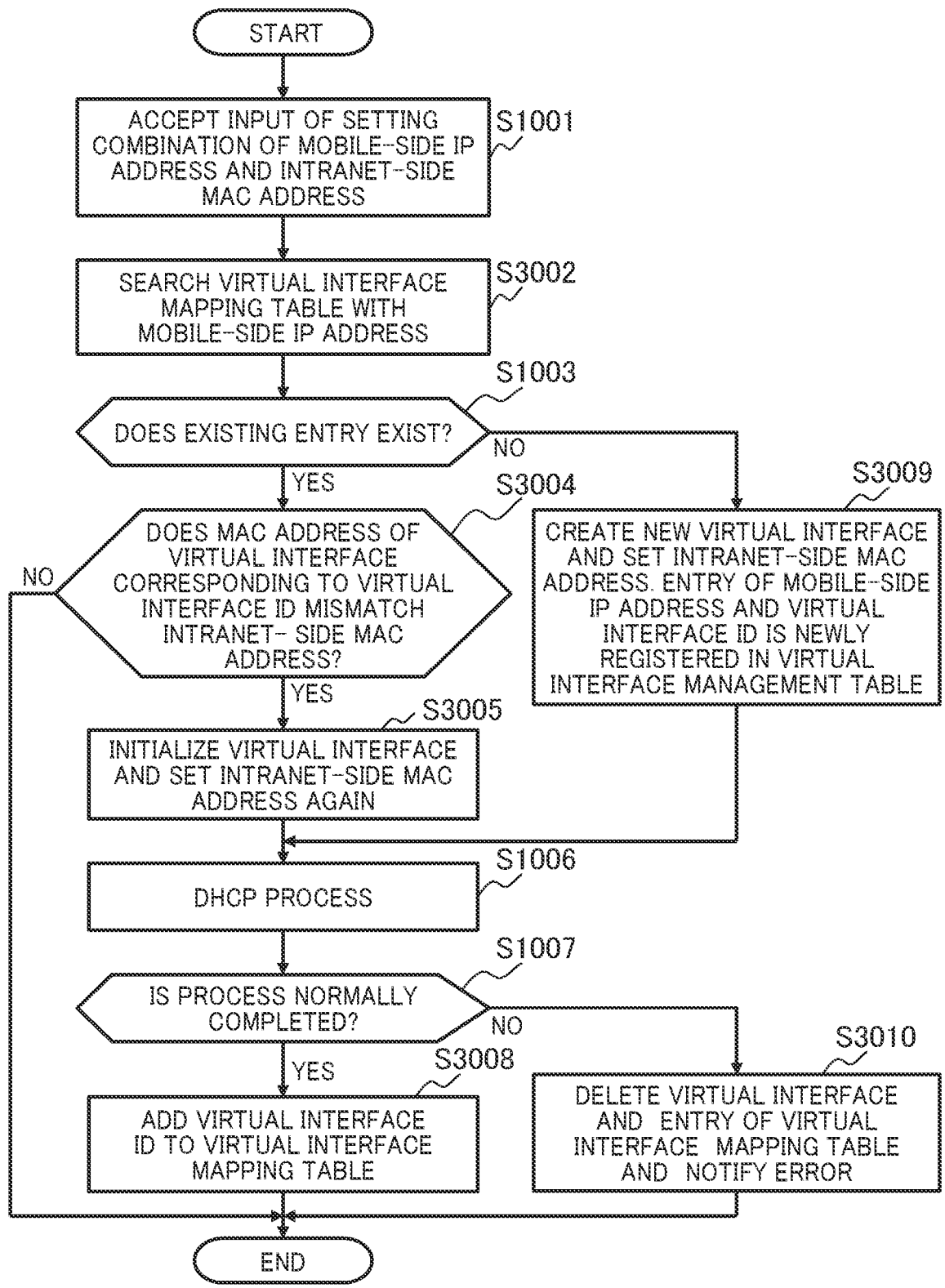
FIG. 27 is a flowchart of the address registration process of the third embodiment.

FIG. 27 is a flowchart of the address registration process of the third embodiment.

First, the control unit 13 of the address translation device 1 accepts an input of setting a combination of a mobile-side IP address and an intranet-side MAC address from the terminal 6 (S1001). The administrator operates an interface screen (a GUI screen of FIG. 11A or a CLI screen of FIG. 11B) displayed on the terminal 6 to input the combination of the mobile-side IP address and the intranet-side MAC address, and sets an acquisition method of the intranet-side IP address.

The control unit 13 searches the virtual interface mapping table 17 with the mobile-side IP address (S3002), and determines whether or not an entry including the mobile-side IP address exists (S1003).

If there is no entry including the mobile-side IP address, a virtual interface is newly created and the intranet-side MAC address is set. Then, an entry of the mobile-side IP address and a virtual interface ID is newly registered in the virtual interface mapping table 17 (S3009).

On the other hand, if there is an entry including the mobile-side IP address, it is determined whether or not the MAC address of the virtual interface corresponding to the virtual interface ID matches the input intranet-side MAC address (S3004). If the MAC address of the virtual interface matches the intranet-side MAC address (NO in S3004), a combination of the mobile-side IP address and the virtual interface ID has already been registered in the virtual interface mapping table 17, and thus the address registration process is terminated. On the other hand, if the MAC address of the virtual interface does not match the intranet-side MAC address (YES in S3004), the intranet-side MAC address for the virtual interface is different, and thus the virtual interface is initialized to set the input intranet-side MAC address again (S3005).

Thereafter, the control unit 13 instructs the virtual interface to perform a DHCP process, and the virtual interface acquires the intranet-side IP address corresponding to the intranet-side MAC address from the DHCP server 21 (S1006). If the DHCP process is normally completed (YES in S1007), the control unit 13 adds the virtual interface ID to the virtual interface mapping table 17 (S3008).

On the other hand, if the DHCP process is abnormally completed (NO in S1007), the virtual interface is deleted, the entry of the virtual interface mapping table 17 is deleted, and an error is notified to the terminal 6 (S3010).

Figure 28:
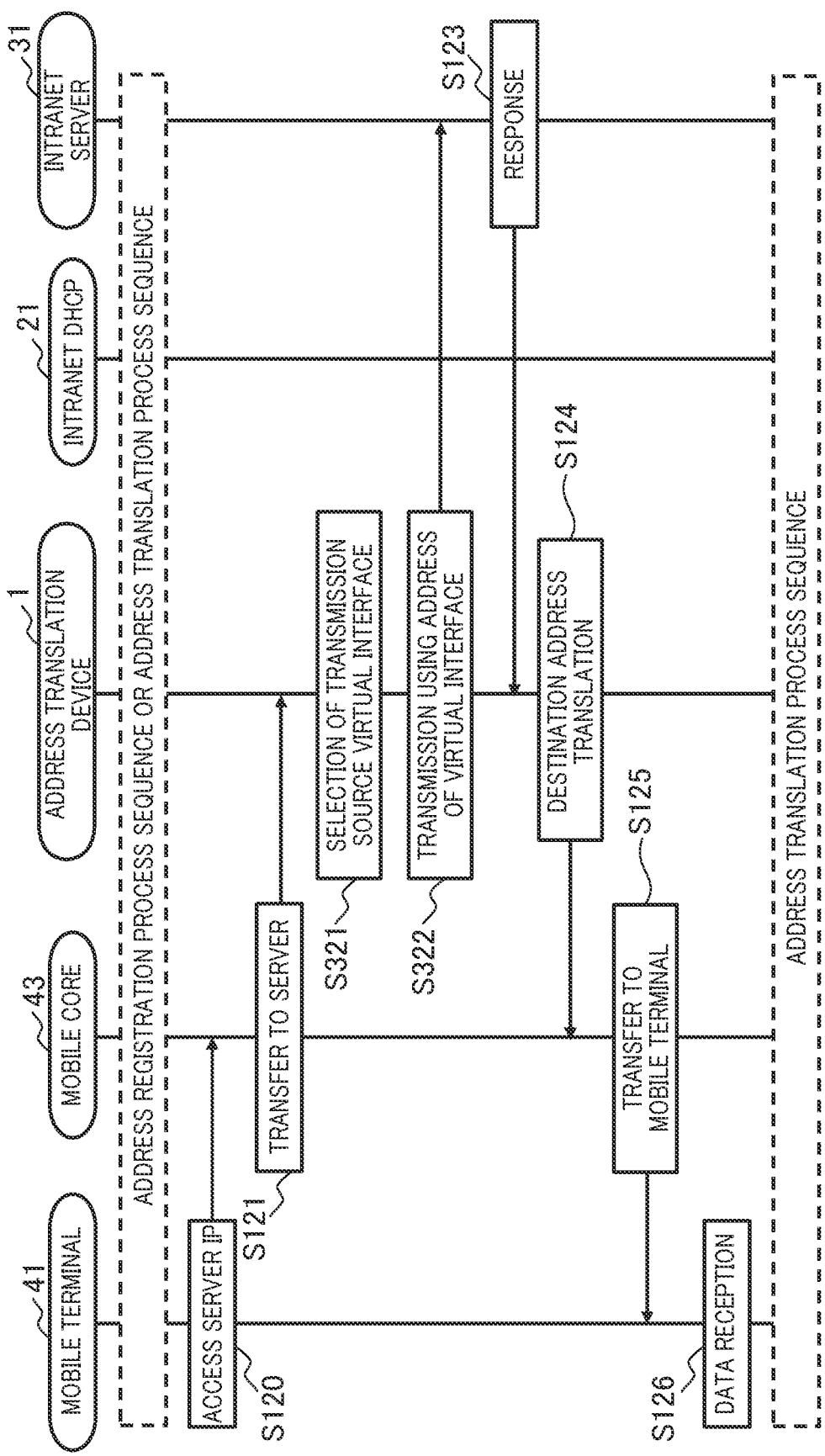
FIG. 28 is a sequence diagram of an address translation process of the third embodiment.

FIG. 28 is a sequence diagram of the address translation process of the third embodiment.

The address translation process shown in FIG. 28 is executed after the address registration process sequence or another address translation sequence.

First, the mobile terminal 41 transmits an access request to the intranet server 31 by using the intranet-side IP address (S120). The mobile core device 43 transfers the request transmitted from the mobile terminal 41 to the intranet server (S121). The address translation device 1 selects a virtual interface for transmitting the request transmitted from the mobile terminal 41 to the intra-network 2 (S321). Then, the address translation device 1 transfers the request transmitted from the mobile terminal 41 to the intranet server 31 by using the address of the virtual interface (S322).

After executing a predetermined process for the request, the intranet server 31 returns a response to the mobile terminal 41 (S123). The response from the intranet server 31 is captured by the address translation device 1. The address translation device 1 translates the destination address of the response from the intranet-side MAC address and the intranet-side IP address into the mobile-side IP address, and transfers the response from the intranet server 31 to the mobile terminal 41 (S124). The mobile core device 43 transfers the response from the intranet server 31 transferred from the address translation device 1 to the mobile terminal 41 (S125).

The mobile terminal 41 can receive the response from the intranet server 31 by the above process (S126).

Thereafter, the address translation sequence is repeated for each access request from the mobile terminal 41.

The address translation process of the third embodiment is the same as those shown in FIG. 12 and FIG. 13 of the first embodiment, but the source IP address translation process (S1104) and the destination IP address translation process (S1105) are different.

Figure 29:
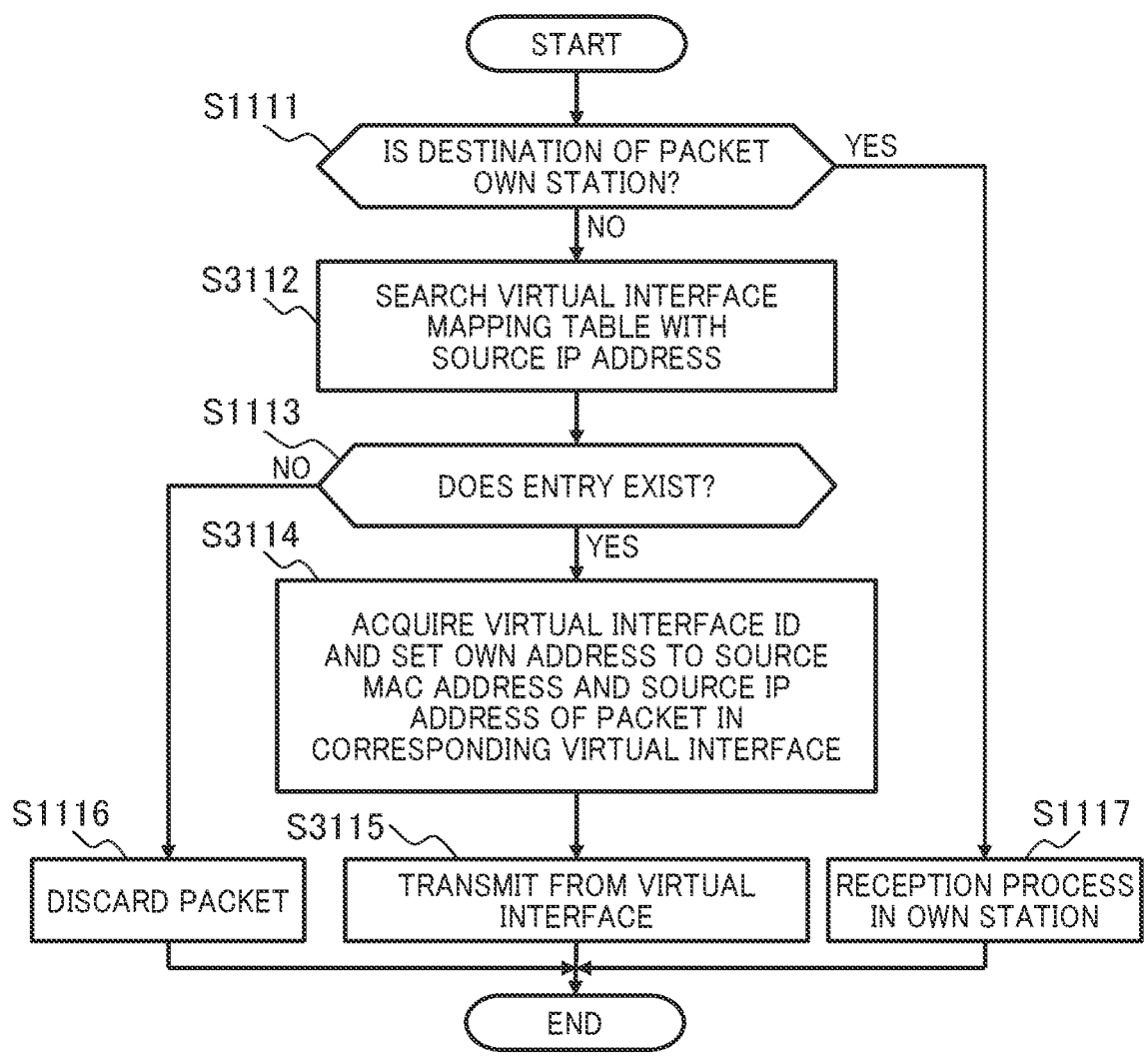
FIG. 29 is a flowchart of a source IP address translation process of the third embodiment.

FIG. 29 is a flowchart of the source IP address translation process (S1104) of the third embodiment, and the source address of a packet transmitted from the mobile network 4 to the intra-network 2 is translated.

The address translation unit 11 determines whether or not the destination of the received packet is the address translation device 1 (S1111). If the destination of the received packet is the address translation device 1, the control unit 13 executes a reception process (S1117). For example, a setting request or the like to the address translation device 1 is transferred by a packet addressed to the address translation device 1.

Thereafter, the virtual interface mapping table 17 is searched with the source IP address of the received packet (S1112). It is determined whether or not an entry including the mobile-side IP address of the transmission source exists (S1113).

If there is no entry including the mobile-side IP address of the transmission source, the received packet is illegal, and thus the received packet is discarded (S1116).

On the other hand, if there is an entry including the mobile-side IP address of the transmission source, the address translation unit 11 acquires the virtual interface ID, transfers the packet to the virtual interface, and the virtual interface sets the MAC address and the IP address of the virtual interface to the source address of the received packet (S3114).

The virtual interface transmits the packet with the address translated (S3115).

Figure 30:
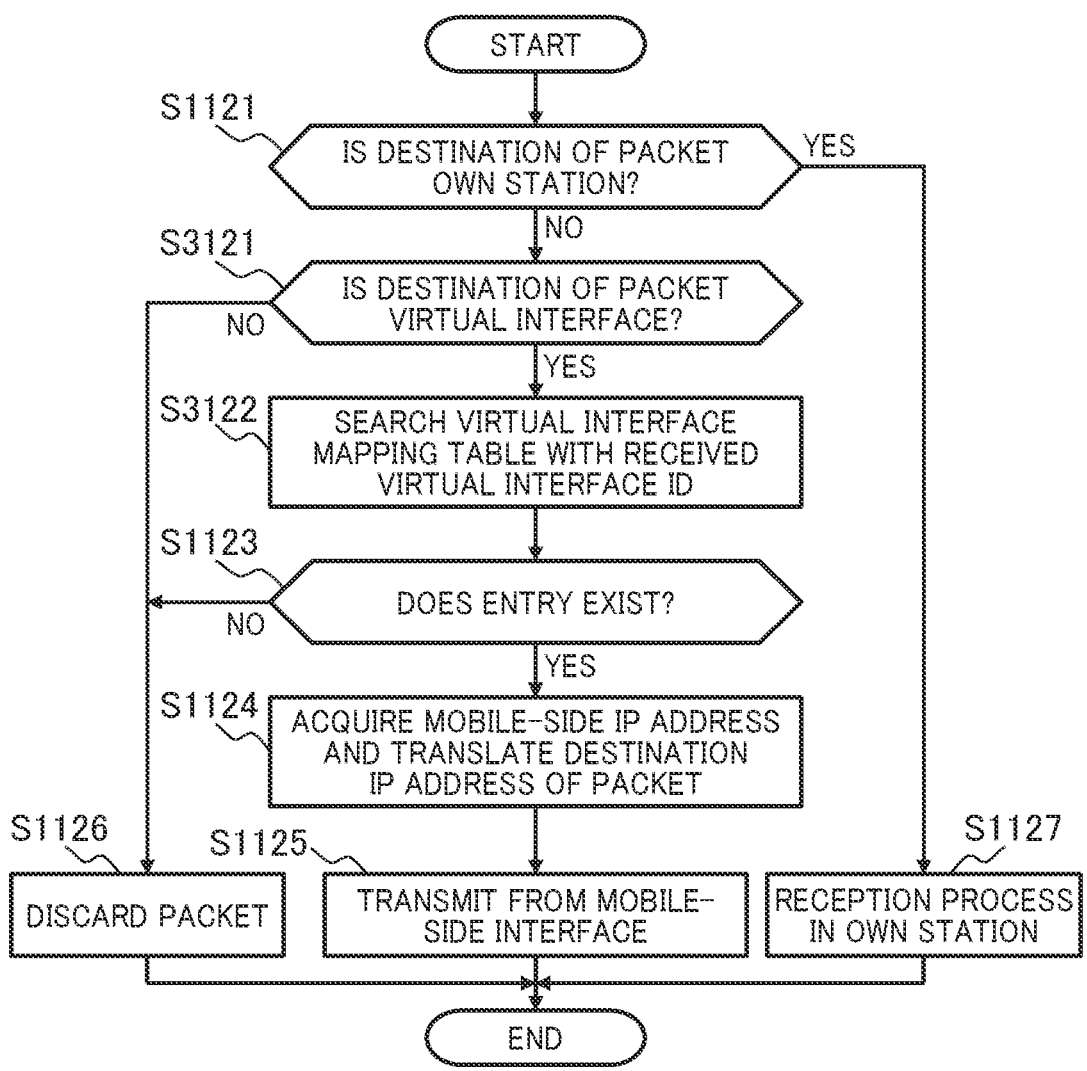
FIG. 30 is a flowchart of a destination IP address translation process of the third embodiment.

FIG. 30 is a flowchart of the destination IP address translation process (S1105) of the third embodiment, and the destination address of a packet transmitted from the intra-network 2 to the mobile network 4 is translated.

The address translation unit 11 determines whether or not the destination of the received packet is the address translation device 1 (S1121). If the destination of the received packet is the address translation device 1, the control unit 13 executes a reception process (S1127). For example, a setting request or the like to the address translation device 1 is transferred by a packet addressed to the address translation device 1.

Thereafter, it is determined whether or not the destination of the received packet is the virtual interface (S3121). If the destination of the received packet is not the virtual interface, the received packet is discarded because it is not a packet to be transferred (S1126). On the other hand, if the destination of the received packet is the virtual interface, the virtual interface mapping table 17 is searched with the received virtual interface ID (S3122). It is determined whether or not an entry including the mobile-side IP address of the destination exists (S1123).

If there is no entry including the mobile-side IP address of the destination, the destination address of the received packet cannot be translated into the mobile-side IP address, and thus the received packet is discarded (S1126).

On the other hand, if there is an entry including the mobile-side IP address of the destination, the address translation unit 11 acquires from the virtual interface mapping table 17 the mobile-side IP address corresponding to the intranet-side IP address of the destination, and translates the destination address of the received packet from the intranet-side MAC address and the intranet-side IP address into the mobile-side IP address (S1124).

The mobile-side interface 10 transmits the packet with the address translated (S1125).

As described above, according to the third embodiment of the present invention, since the virtual interface unit 18 performs the process of the DHCP, the load of the address translation unit 11 can be reduced.

Fourth Embodiment

Next, a fourth embodiment of the present invention will be described. In the fourth embodiment, addresses are translated by bidirectional communications between the intra-network 2 and the mobile network 4. Therefore, if the mobile terminal 41 knows the URL of the access destination, the mobile terminal 41 can access the intranet server 31 without knowing the IP address, and the adjustment of the address system between the intra-network 2 and the mobile network 4 is not necessary. In the fourth embodiment, the same configurations and functions as those in the above-described first to third embodiments will be denoted by the same reference numerals, and the description thereof will be omitted.

Figures 31, 32:
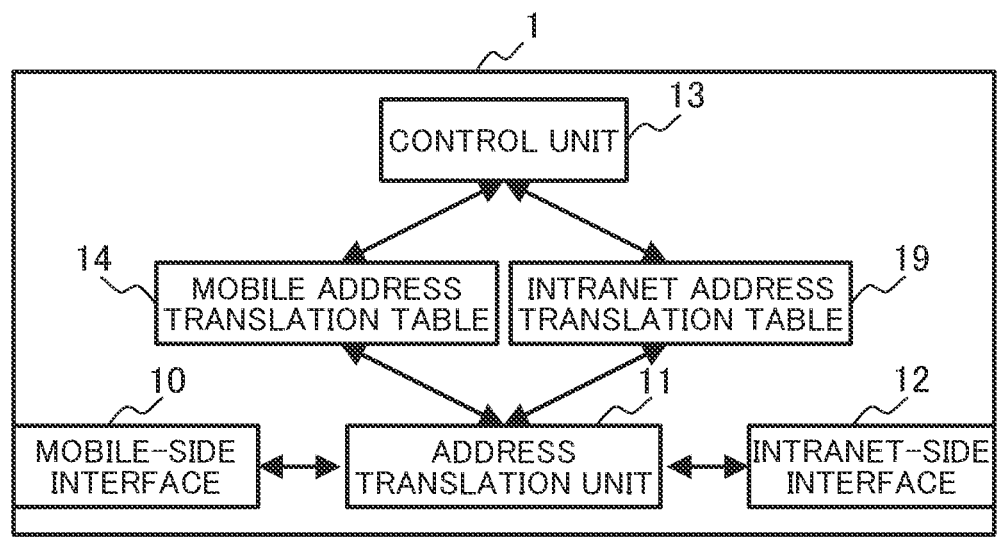
FIG. 31 is a diagram for showing a configuration of an address translation device of a fourth embodiment.
FIG. 32 is a diagram for showing a configuration example of an intranet address translation table of the fourth embodiment.

FIG. 31 is a diagram for showing a configuration of an address translation device 1 of the fourth embodiment.

The address translation device 1 of the fourth embodiment includes a mobile-side interface 10, an address translation unit 11, an intranet-side interface 12, a control unit 13, a mobile address translation table 14, and an intranet address translation table 19. The intranet address translation table 19 holds information for translating an intranet-side IP address used in the intra-network 2 and a mobile-side IP address used in the mobile network 4. The configuration of the intranet address translation table 19 will be described later with reference to FIG. 32.

FIG. 32 is a diagram for showing a configuration example of the intranet address translation table 19 of the fourth embodiment.

The intranet address translation table 19 associates and records an intranet-side IP address 105 used in the intra-network 2 and a mobile-side IP address 106 used in the mobile network 4. A mobile-side IP address can be assigned to a device in the intra-network 2 by the intranet address translation table 19.

Figure 33:
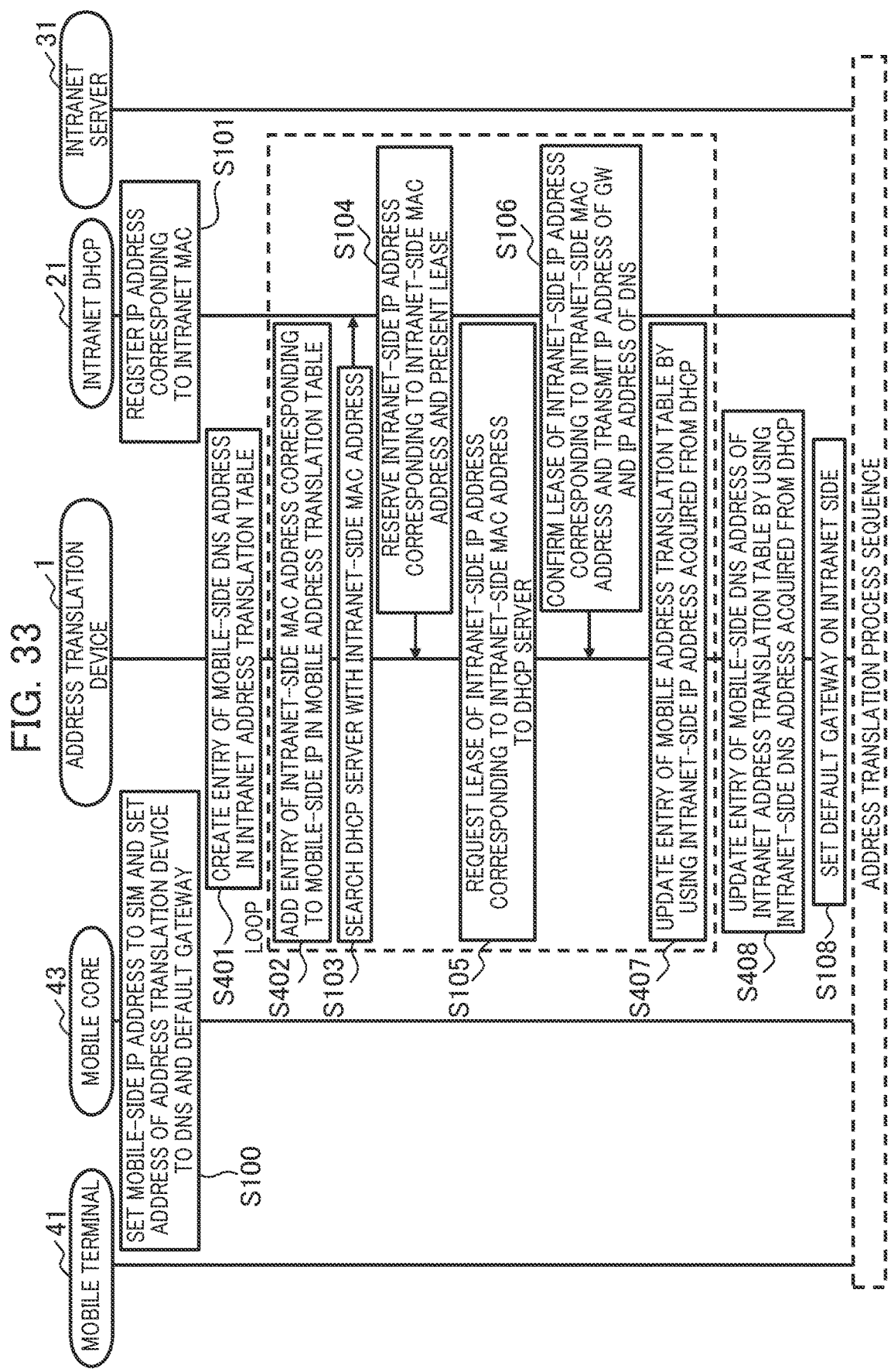
FIG. 33 is a sequence diagram of an address registration process of the fourth embodiment.

FIG. 33 is a sequence diagram of the address registration process of the fourth embodiment.

First, the mobile core device 43 sets the mobile-side IP address to identification information (for example, IMSI) assigned to the SIM attached to the mobile terminal 41, and sets the address of the address translation device 1 to the address of the DNS server and the address of the default gateway (S100). In addition, the DHCP server 21 accepts registration of an IP address corresponding to the intranet MAC address (S101). In the registration of the IP address, information input to the terminal 24 may be accepted, or an address dynamically assigned by using a DHCP function may be registered.

Thereafter, the address translation device 1 creates an entry of a mobile-side DNS address in the intranet address translation table 19 (S401).

Thereafter, the address translation device 1 repeats the loop of Steps S102 to S407 for each mobile terminal 41 to be registered. First, the address translation device 1 accepts an entry of the intranet-side MAC address corresponding to the mobile-side IP address by a setting input from the terminal 6, and adds the entry to the mobile address translation table 14 (S402). Next, the address translation device 1 searches the DHCP server 21 with the intranet-side MAC address (S103).

The DHCP server 21 reserves the intranet-side IP address corresponding to the intranet-side MAC address, and presents a lease of the intranet-side IP address (S104). The address translation device 1 requests a lease of the intranet-side IP address corresponding to the intranet-side MAC address with the lease presented to the DHCP server 21 (S105). The DHCP server confirms the lease of the intranet-side IP address corresponding to the intranet-side MAC address, and transmits the IP address of the gateway and the IP address of the DNS server 23 (S106). The address translation device 1 updates the entry of the mobile address translation table 14 by using the intranet-side IP address acquired from the DHCP server 21 (S407).

After the completion of the loop process, the address translation device 1 updates the entry of the mobile-side DNS address of the intranet address translation table 19 by using the intranet-side DNS address acquired from the DHCP server 21 (S408), and sets the address of the default gateway on the intranet side to the IP address of the gateway acquired from the DHCP server 21 (S108).

It should be noted that although not shown in the drawing, as similar to S109 to S110 of FIG. 7, when the mobile terminal is attached to the mobile core device 43 at the time of starting communications, a mobile-side IP address is assigned. If the mobile terminal 41 is attached to the mobile core device 43 after an address is registered in the address translation device 1, a mobile-side IP address with which a set of an intranet-side MAC address and an intranet-side IP address is associated is assigned.

The address registration process is completed at this time, and the address translation device 1 can start an address translation sequence (see FIG. 12).

It should be noted that in the fourth embodiment, the mobile terminal 41 may be authenticated by using the procedures of S110 to S112 of FIG. 8.

Figure 34:
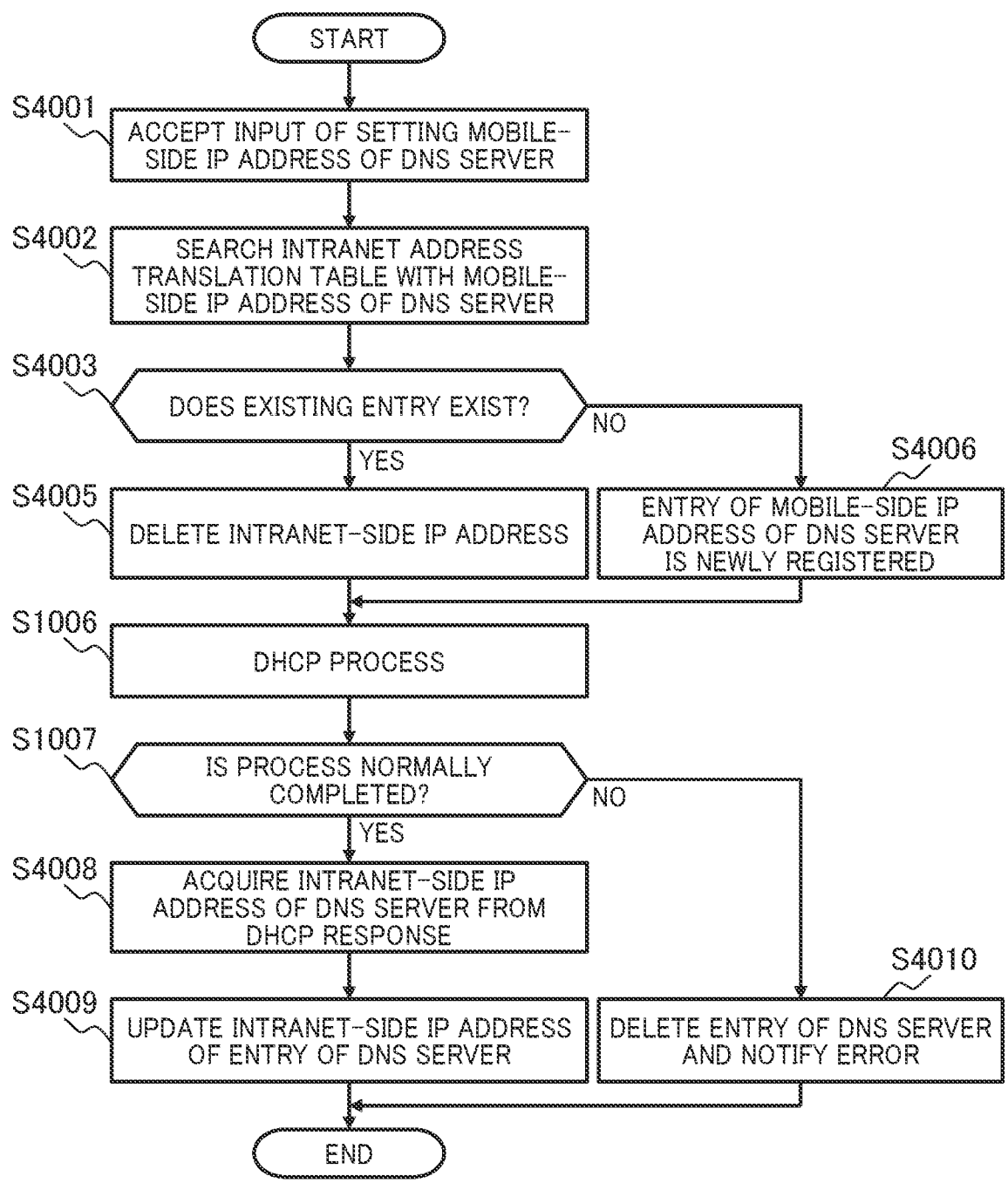
FIG. 34 is a flowchart of the address registration process of the fourth embodiment.

FIG. 34 is a flowchart of the address registration process of the fourth embodiment.

First, the control unit 13 of the address translation device 1 accepts an input of setting the mobile-side IP address of the DNS server 23 from the terminal 6 (S4001).

The control unit 13 searches the intranet address translation table 19 with the mobile-side IP address of the DNS server 23 (S4002), and determines whether or not an entry including the mobile-side IP address exists (S4003).

If there is no entry including the mobile-side IP address, an entry of the mobile-side IP address of the DNS server 23 is newly registered in the mobile address translation table 14 (S4006).

On the other hand, if there is an entry including the mobile-side IP address, the intranet-side IP address is deleted (S4005).

Thereafter, the control unit 13 performs a DHCP process, and acquires the intranet-side IP address corresponding to the intranet-side MAC address from the DHCP server 21 (S1006). If the DHCP process is normally completed (YES in S1007), the intranet-side IP address of the DNS server 23 is acquired from the response from the DHCP server 21 (S4008), and the intranet-side IP address of the entry of the DNS server 23 is updated (S4009).

On the other hand, if the DHCP process is abnormally completed (NO in S1007), the entry of the DNS server 23 is deleted from the intranet address translation table 19, and an error is notified to the terminal 6 (S4010).

Figure 35:
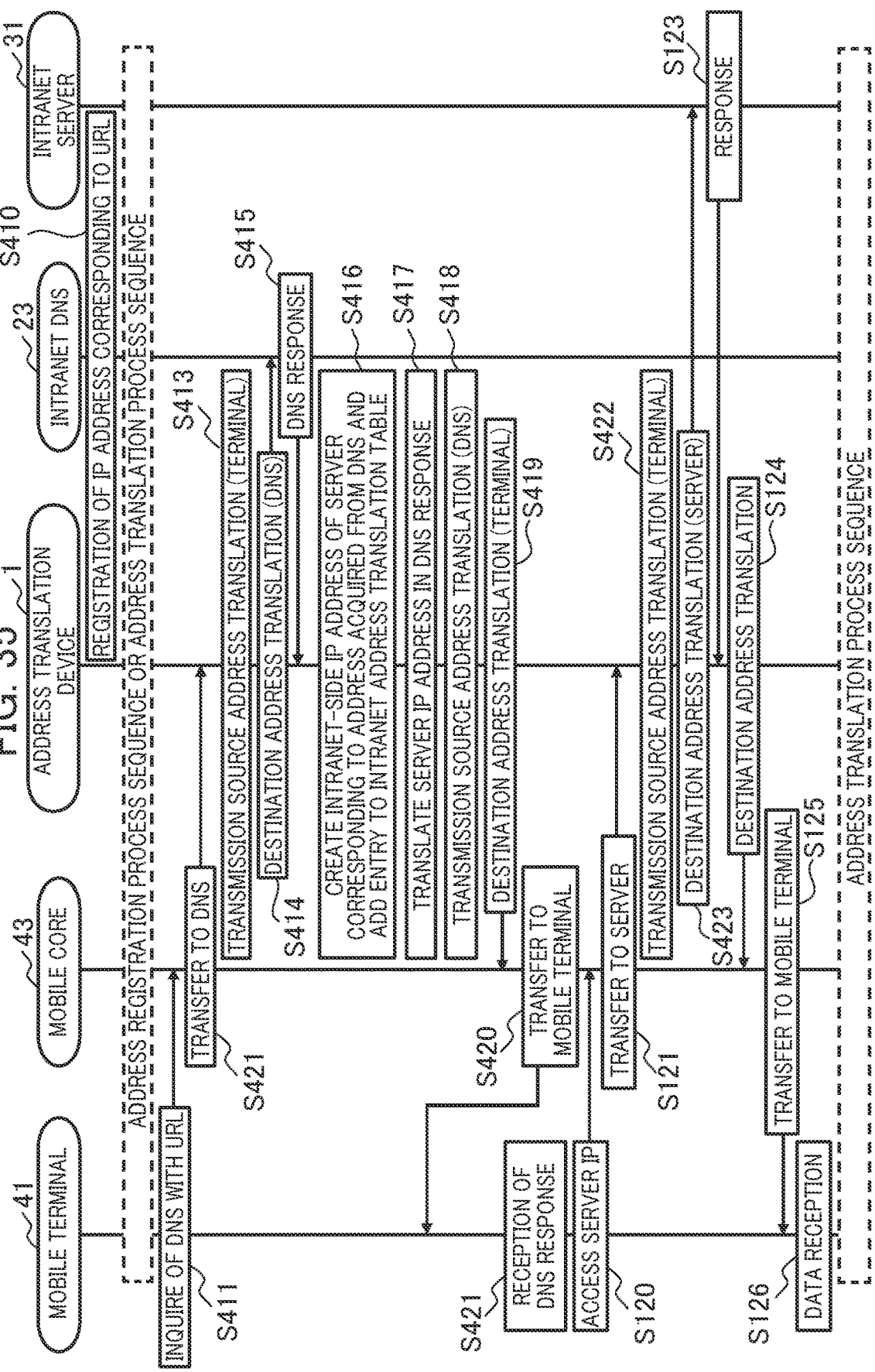
FIG. 35 is a sequence diagram of an address translation process of the fourth embodiment.

FIG. 35 is a sequence diagram of the address translation process of the fourth embodiment.

The address translation process shown in FIG. 35 is executed after the address registration process sequence or another address translation sequence.

First, the DNS server 23 registers an IP address corresponding to the URL of the intranet server 31 (S410). Thereafter, the address registration process sequence or the address translation sequence is executed.

The mobile terminal 41 inquires of the DNS server 23 about the IP address corresponding to the URL of the intranet server 31 to be accessed (S411). The mobile core device 43 transfers the inquiry transmitted from the mobile terminal 41 to the intranet server 31 (S421). The address translation device 1 translates the address of the mobile terminal 41 of the inquiry transmission source from the mobile-side IP address into the intranet-side MAC address and the intranet-side IP address (S413), translates the address of the DNS server 23 of the inquiry destination from the mobile-side IP address into the intranet-side MAC address and the intranet-side IP address, and transfers the request transmitted from the mobile terminal 41 to the DNS server 23 (S414).

The DNS server 23 searches the IP address with the inquiry URL and returns a response to the mobile terminal 41 (S415). The response from the DNS server 23 is captured by the address translation device 1. The address translation device 1 generates the intranet-side IP address of the intranet server 31 corresponding to the address acquired from the DNS server 23, and adds an entry to the intranet address translation table 19 (S416). Then, the address translation device 1 translates the intranet-side IP address of the intranet server 31 in a DNS message into the mobile-side IP address, translates the intranet-side IP address of the DNS server 23 of the transmission source into the mobile-side IP address (S418), translates the intranet-side IP address of the mobile terminal 41 of the destination into the mobile-side IP address, and transfers the reply from the DNS server 23 to the mobile terminal 41 (S419). The mobile core device 43 transfers the response from the DNS server 23 transferred from the address translation device 1 to the mobile terminal 41 (S420).

The mobile terminal 41 receives the response from the DNS server 23 by the above process (S421), and can know the IP address from the URL.

Thereafter, the mobile terminal 41 transmits an access request to the intranet server 31 by using the intranet-side IP address acquired from the DNS server 23 (S120). The mobile core device 43 transfers the request transmitted from the mobile terminal 41 to the intranet server 31 (S121). The address translation device 1 translates the address of the mobile terminal 41 of the request transmission source from the mobile-side IP address into the intranet-side MAC address and the intranet-side IP address (S422), translates the address of the intranet server 31 of the request destination from the mobile-side IP address into the intranet-side MAC address and the intranet-side IP address, and transfers the request transmitted from the mobile terminal 41 to the intranet server 31 (S423).

After executing a predetermined process for the request, the intranet server 31 returns a response to the mobile terminal 41 (S123). The response from the intranet server 31 is captured by the address translation device 1. The address translation device 1 translates the destination address of the response from the intranet-side MAC address and the intranet-side IP address into the mobile-side IP address, and transfers the response from the intranet server 31 to the mobile terminal 41 (S124). The mobile core device 43 transfers the reply from the intranet server 31 transferred from the address translation device 1 to the mobile terminal 41 (S125).

The mobile terminal 41 can receive the response from the intranet server 31 by the above process (S126). Thereafter, the address translation sequence is repeated for each access request from the mobile terminal 41.

Figure 36:
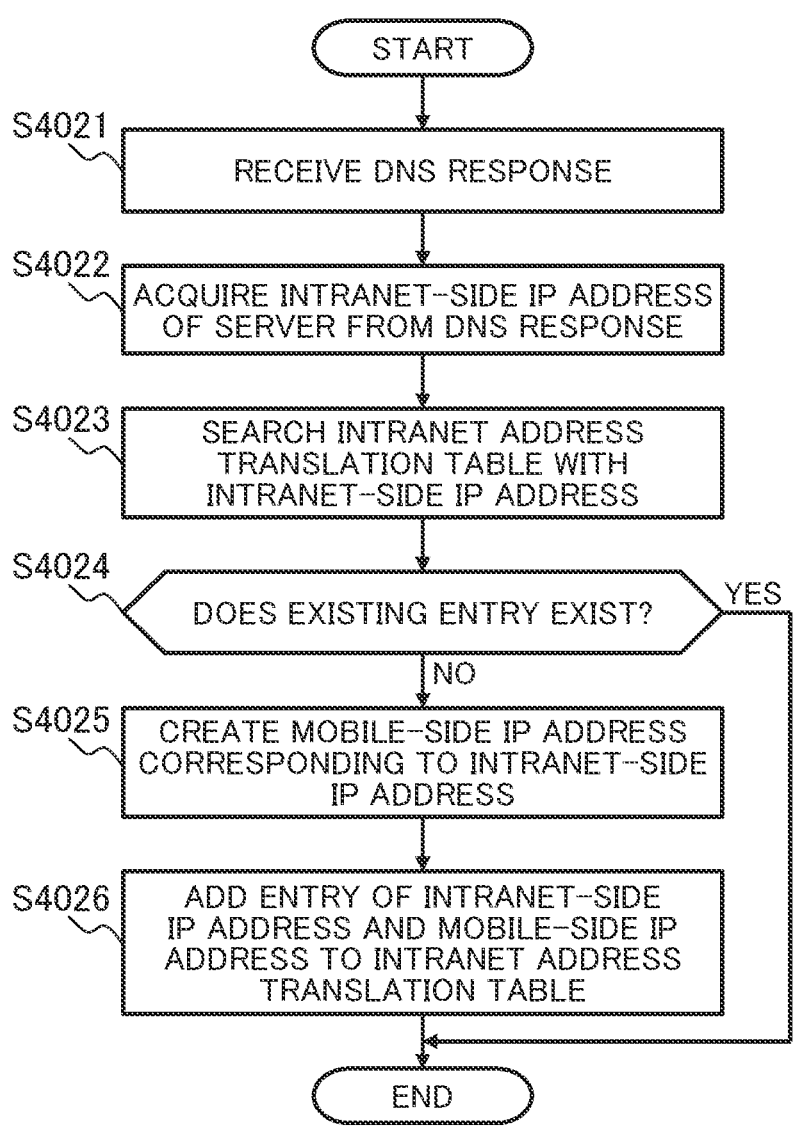
FIG. 36 is a flowchart of a DNS entry registration process of the fourth embodiment.

FIG. 36 is a flowchart of a DNS entry registration process (S416).

When receiving the response from the DNS server 23 (S4021), the control unit 13 of the address translation device 1 acquires the intranet-side IP address of the intranet server 31 from the received response (S4022). Then, the intranet address translation table 19 is searched with the acquired intranet-side IP address (S4023). In the case where an entry of the acquired intranet-side IP address exists in the intranet address translation table 19 (YES in S4024), the entry of the intranet-side IP address acquired from the DNS server 23 is registered in the intranet address translation table 19, and thus the DNS entry registration process is terminated.

On the other hand, in the case where there is no entry of the acquired intranet-side IP address in the intranet address translation table 19 (NO in S4024), a mobile-side IP address corresponding to the intranet-side IP address is generated (S4025), and an entry of the intranet-side IP address and the mobile-side IP address is added to the intranet address translation table 19 (S4026).

The address translation process of the fourth embodiment is the same as those shown in FIG. 12 and FIG. 13 of the first embodiment, but the source IP address translation process (S1104) and the destination IP address translation process (S1105) are different.

Figure 37:
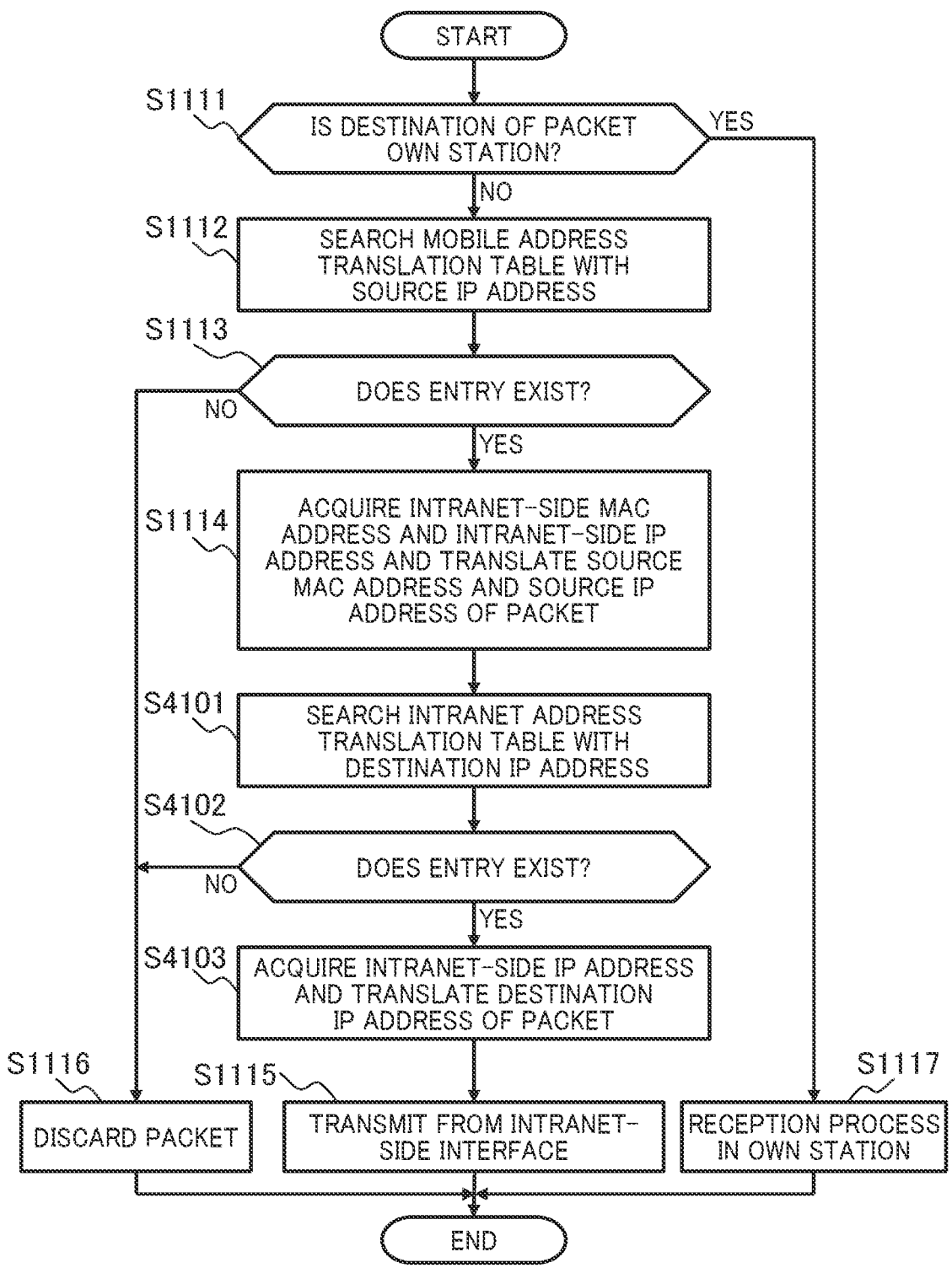
FIG. 37 is a flowchart of a source IP address translation process of the fourth embodiment.

FIG. 37 is a flowchart of the source IP address translation process (S1104) of the fourth embodiment, and the source address and the destination address of a packet transmitted from the mobile network 4 to the intra-network 2 are translated.

The address translation unit 11 determines whether or not the destination of the received packet is the address translation device 1 (S1111). If the destination of the received packet is the address translation device 1, the control unit 13 executes a reception process (S1117). For example, a setting request or the like to the address translation device 1 is transferred by a packet addressed to the address translation device 1.

Thereafter, the address translation unit 11 searches the mobile address translation table 14 with the source IP address of the received packet (S1112), and determines whether or not an entry including the mobile-side IP address of the transmission source exists (S1113).

If there is no entry including the mobile-side IP address of the transmission source, the received packet is illegal, and thus the received packet is discarded (S1116).

On the other hand, if there is an entry including the mobile-side IP address of the transmission source, the address translation unit 11 acquires the intranet-side MAC address and the intranet-side IP address corresponding to the mobile-side IP address of the transmission source, and translates the source address of the received packet from the mobile-side IP address into the intranet-side MAC address and the intranet-side IP address (S1114).

Thereafter, the address translation unit 11 searches the intranet address translation table 19 with the destination IP address of the received packet (S4101), and determines whether or not an entry including the mobile-side IP address of the destination exists (S4102).

If there is no entry including the mobile-side IP address of the destination, the destination address of the received packet cannot be translated into the mobile-side IP address, and thus the received packet is discarded (S1116).

On the other hand, if there is an entry including the mobile-side IP address of the destination, the intranet-side IP address is acquired from the intranet address translation table 19, and the destination IP address of the packet is rewritten (S4103).

The intranet-side interface 12 transmits the packet with the address translated (S1115).

Figure 38:
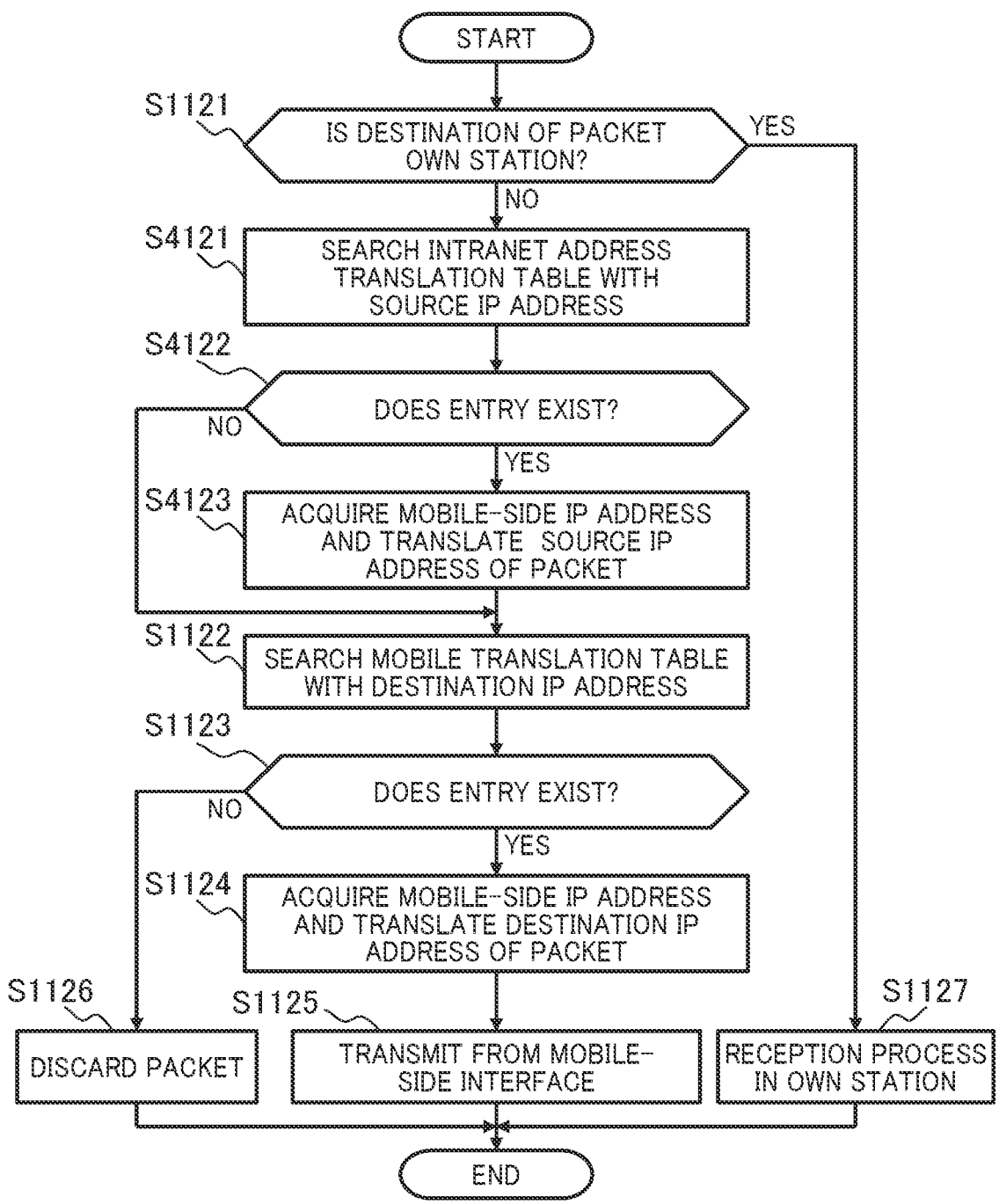
FIG. 38 is a flowchart of a destination IP address translation process of the fourth embodiment.

FIG. 38 is a flowchart of the destination IP address translation process (S1105) of the fourth embodiment, and the source address and the destination address of a packet transmitted from the intra-network 2 to the mobile network 4 are translated.

The address translation unit 11 determines whether or not the destination of the received packet is the address translation device 1 (S1121). If the destination of the received packet is the address translation device 1, the control unit 13 executes a reception process (S1127). For example, a setting request or the like to the address translation device 1 is transferred by a packet addressed to the address translation device 1.

The address translation unit 11 searches the intranet address translation table 19 with the source IP address of the received packet (S4121). It is determined whether or not an entry including the mobile-side IP address of the transmission source exists (S4122).

If there is an entry including the mobile-side IP address of the transmission source, the mobile-side IP address is acquired from the intranet address translation table 19, and the source IP address of the packet is rewritten (S4123).

On the other hand, if there is no entry including the mobile-side IP address of the transmission source, the flow proceeds to Step S1122 without rewriting the address.

Thereafter, the mobile address translation table 14 is searched with the destination IP address of the received packet (S1122). It is determined whether or not an entry including the mobile-side IP address of the destination exists (S1123).

If there is no entry including the mobile-side IP address of the destination, the destination address of the received packet cannot be translated into the mobile-side IP address, and thus the received packet is discarded (S1126).

On the other hand, if there is an entry including the mobile-side IP address of the destination, the address translation unit 11 acquires from the mobile address translation table 14 the mobile-side IP address corresponding to the intranet-side MAC address and the intranet-side IP address of the destination, and translates the destination address of the received packet from the intranet-side MAC address and the intranet-side IP address into the mobile-side IP address (S1124).

The mobile-side interface 10 transmits the packet with the address translated (S1125).

As described above, according to the fourth embodiment of the present invention, both addresses of a packet from the intra-network 2 to the mobile network 4 and a packet from the mobile network 4 to the intra-network 2 can be translated. In addition, since the intranet-side IP address is acquired from the DNS server 23, the mobile terminal 41 can access the intranet server 31 without knowing the IP address of the intranet server 31. Therefore, a device on the intra-network side can be easily accessed from the mobile network side.

It should be noted that the present invention is not limited to the above-described embodiments, but includes various modifications and equivalent configurations within the scope of the attached claims. For example, the above-described embodiments have been described in detail in order to clearly explain the present invention, and the present invention is not necessarily limited to those including all the configurations described above. In addition, some configurations of an embodiment may be replaced by a configuration of another embodiment. In addition, a configuration of an embodiment may be added to a configuration of another embodiment. In addition, some configurations of each embodiment may be added to, deleted from, and replaced by other configurations.

In addition, some or all of the above-described configurations, functions, processing units, processing means, and the like may be realized using hardware by designing with, for example, integrated circuits, or may be realized using software in such a manner that a processor interprets and executes a program realizing each function.

Information of a program, a table, a file, and the like realizing each function can be stored in a storage device such as a memory, a hard disk, or an SSD (Solid State Drive), or a recording medium such as an IC card, an SD card, or a DVD.

In addition, the control lines and the information lines considered to be necessary for explanation are shown, but all the control lines and the information lines necessary for implementation are not necessarily shown. In practice, almost all the configurations may be considered to be connected to each other.

What is declared is:

1. A network system for transferring a packet, comprising:
a first network that controls transfer of data at a first layer;
a second network that is connected to the first network and controls transfer of data at the first layer while managing devices in the second network at a second layer different from the first layer;
a device that is connected to the first network but disconnected from the second network; and
a processor programmed to translate addresses between the first network and the second network,
wherein the processor accepts a configuration including a type of an address of the second layer of the second network and translates an address of the first layer of the first network attached to data transferred from the first network to the second network into the address of the second layer, which is a same type as the type of the configuration, based on address translation information that holds a correspondence relationship between the address of the first network and the address of the second network, to produce a translated address, and
wherein the device communicates with the second network via the processor based on the translated address.

2. The network system according to claim 1,
wherein the first network transfers data by using an IP address of a layer 3 and the second network transfers data by using a MAC address of a layer 2, and
wherein the processor translates an IP address of the first network attached to data transferred from the first network to the second network into a MAC address and an IP address of the second network.

3. The network system according to claim 2,
wherein the processor has:
a first interface that transmits and receives data to/from the first network;
a second interface that transmits and receives data to/from the second network; and
the address translation information holds a correspondence relationship between the IP address of the first network and the MAC address and the IP address of the second network;
wherein the processor is programmed to refer to the address translation information to translate the IP address of the first network into the MAC address and the IP address of the second network.

4. The network system according to claim 3,
wherein the processor is programmed to control registration of an address, and
wherein the processor acquires the IP address of the second network from a DHCP server by using the MAC address of the second network and registers the same in the address translation information.

5. The network system according to claim 1,
wherein the processor has:
a first interface that transmits and receives data to/from the first network;
a second interface that transmits and receives data to/from the second network;
MAC address translation information that holds a correspondence relationship between an IP address of the first network and a MAC address of the second network; and
IP address translation information that holds a correspondence relationship between the IP address of the first network and an IP address of the second network;
wherein the processor is programmed to refer to the MAC address translation information and the IP address translation information to translate the IP address of the first network into the MAC address and the IP address of the second network.

6. The network system according to claim 1,
wherein the processor has:
a first interface that transmits and receives data to/from the first network;
a second interface that transmits and receives data to/from the second network;
a virtual interface that manages a MAC address and an IP address of the second network; and
virtual interface correspondence information that holds a correspondence relationship between an IP address of the first network and the virtual interface;
wherein the processor is programmed to refer to the virtual interface correspondence information to determine a virtual interface for transmitting data transferred from the first network to the second network and transmits the data,
wherein the virtual interface translates the IP address of the first network attached to data transferred to the second network into the MAC address and the IP address of the second network.

7. The network system according to claim 1,
wherein the processor has:
a first interface that transmits and receives data to/from the first network;
a second interface that transmits and receives data to/from the second network;
first address translation information that holds a correspondence relationship between an IP address of the first network and a MAC address and an IP address of the second network; and
second address translation information that holds a correspondence relationship between the IP address of the second network and the IP address of the first network;
wherein the processor is programmed to refer to the first address translation information to translate the IP address of the first network attached to data transferred from the first network to the second network into the MAC address and the IP address of the second network, and
wherein the processor refers to the second address translation information to translate the IP address of the second network attached to data transferred from the second network to the first network into the IP address of the first network.

8. The network system according to claim 7,
wherein the processor generates the IP address of the first network corresponding to an IP address included in a DNS response to a DNS request transmitted from the first network to a DNS server of the second network and registers the same in the second address translation information.

9. A communication control device provided in a network system for transferring a packet,
wherein the network system comprises a first network that controls transfer of data at a first layer and a second network that is connected to the first network and controls transfer of data at the first layer while managing devices in the second network at a second layer different from the first layer, and
wherein the communication control device includes;
a first interface that transmits and receives data to/from the first network;
a second interface that transmits and receives data to/from the second network;
a device that is connected to the first network but disconnected from the second network; and
a processor programmed to translate an address of the first layer of the first network into an address of the second layer of the second network;
wherein the processor accepts a configuration including a type of the address of the second layer of the second network and translates the address of the first layer of the first network attached to data transferred from the first network to the second network into the address of the second layer, which is a same type as the type of the configuration, based on address translation information that holds a correspondence relationship between the address of the first network and the address of the second network, to produce a translated address; and
wherein the device communicates with the second network via the processor based on the translated address.

10. A communication control method executed by a processor in a network system for transferring a packet, wherein the network system has a first network that controls transfer of data at a first layer, a second network that is connected to the first network and controls transfer of data at the first layer while managing devices in the second network at a second layer different from the first layer, a device that is connected to the first network but disconnected from the second network, and the processor, the communication control method comprising:
accepting, by the processor, a configuration including a type of the address of the second layer of the second network;
registering a correspondence relationship between the address of the first layer of the first network and the address of the second layer of the second network;
translating the address of the first layer of the first network attached to data transferred from the first network to the second network into the address of the second layer of the second network, which is a same type as the type of the configuration, based on address translation information that holds the correspondence relationship, to produce a translated address; and
communicating, by the device, with the second network via the processor based on the translated address.

* * * * *